US012273887B2

United States Patent
Li et al.

(10) Patent No.: US 12,273,887 B2
(45) Date of Patent: Apr. 8, 2025

(54) INFORMATION TRANSMISSION METHOD AND APPARATUS FOR SENDING OR RECEIVING JOINT INFORMATION OF UPLINK CONTROL INFORMATION

(71) Applicant: HUAWEI TECHNOLOGIES CO., LTD., Shenzhen (CN)

(72) Inventors: Shengyu Li, Beijing (CN); Lei Guan, Beijing (CN); Ruixiang Ma, Beijing (CN); Dan Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 679 days.

(21) Appl. No.: 17/168,687

(22) Filed: Feb. 5, 2021

(65) Prior Publication Data

US 2021/0168846 A1 Jun. 3, 2021

Related U.S. Application Data

(63) Continuation of application No. PCT/CN2019/099317, filed on Aug. 5, 2019.

(30) Foreign Application Priority Data

Aug. 6, 2018 (CN) .......................... 201810887590.2

(51) Int. Cl.
*H04W 72/23* (2023.01)
*H04L 1/00* (2006.01)
(Continued)

(52) U.S. Cl.
CPC ............. *H04W 72/23* (2023.01); *H04L 1/001* (2013.01); *H04L 5/0055* (2013.01); *H04W 72/21* (2023.01); *H04W 72/56* (2023.01)

(58) Field of Classification Search
CPC ..... H04W 72/23; H04W 72/21; H04W 72/56; H04W 72/569; H04W 74/004;
(Continued)

(56) References Cited

U.S. PATENT DOCUMENTS 11,265,853 B2 * 3/2022 Kundu .................. H04L 5/0057
2015/0223213 A1 * 8/2015 Moon .................. H04W 52/325
370/329
(Continued)

FOREIGN PATENT DOCUMENTS

CN 105991249 A 10/2016
CN 107431932 A 12/2017
(Continued)

OTHER PUBLICATIONS

OPPO, May 25, 2018, 3GPP, 3GPP TSG RAN WG1 Meeting #93, p. 1-6 (Year: 2018).*
(Continued)

*Primary Examiner* — Alex Skripnikov
*Assistant Examiner* — Angelie T Ngo
(74) *Attorney, Agent, or Firm* — HAUPTMAN HAM, LLP

(57) ABSTRACT

A first uplink channel is obtained to carry joint information of second uplink control information carried on a second channel and third uplink control information carried on a third uplink channel. In response to the first and third uplink channels meeting a first condition, the joint information is sent on the first uplink channel. Otherwise, the third uplink control information is sent on the third uplink channel. The first condition includes at least one of: (i) a distance between ending symbols on the first and third uplink channels is less than or equal to a first threshold, (ii) a distance between starting symbols on the first and third uplink channels is less than or equal to a second threshold, or (iii) a difference
(Continued)

between coding rates of the first and third uplink channels is less than or equal to a third threshold.

20 Claims, 6 Drawing Sheets

(51) Int. Cl.
*H04L 5/00* (2006.01)
*H04W 72/21* (2023.01)
*H04W 72/56* (2023.01)

(58) Field of Classification Search
CPC ..... H04L 1/001; H04L 1/1671; H04L 1/1854; H04L 1/1864; H04L 5/0007; H04L 5/0044; H04L 5/0053; H04L 5/0055; H04L 5/0057; H04L 5/0058; H04L 5/0064

See application file for complete search history.

(56) References Cited

U.S. PATENT DOCUMENTS

| | | | |
|---|---|---|---|
| 2017/0171842 A1 | 6/2017 | You et al. | |
| 2017/0318575 A1* | 11/2017 | Park | H04L 1/1664 |
| 2018/0302895 A1* | 10/2018 | Akkarakaran | H04L 5/0082 |
| 2019/0053097 A1* | 2/2019 | Rico Alvarino | H04L 1/0029 |
| 2020/0367265 A1* | 11/2020 | Wang | H04L 1/1854 |
| 2020/0404658 A1* | 12/2020 | Lin | H04L 1/1861 |
| 2021/0058919 A1* | 2/2021 | Takeda | H04W 72/0446 |
| 2021/0144702 A1* | 5/2021 | Zhao | H04W 72/23 |
| 2021/0218519 A1* | 7/2021 | Gou | H04W 72/0453 |

FOREIGN PATENT DOCUMENTS

| | | |
|---|---|---|
| CN | 107846731 A | 3/2018 |
| CN | 107911204 A | 4/2018 |
| CN | 108183775 A | 6/2018 |
| CN | 107925445 B | 8/2020 |

OTHER PUBLICATIONS

OPPO: ""Discussion on overlapped UL transmissions with URLLC"", 3GPP Draft; R1-1806837, vol. RAN WG1, No. Busan, Korea; May 21, 2018-May 25, 2018, May 20, 2018, XP051442037, 4 pages.
VIVO: "Discussion on eMBB and URLLC UCI multiplexing", 3GPP Draft; R1-1806064, vol. RAN WG1, No. Busan, Korea; May 21, 2018-May 25, 2018, May 12, 2018, pp. 1-4, XP051462329.
Extended European Search Report issued in corresponding European Application No. 19847871.1, dated Aug. 12, 2021, pp. 1-8, European Patent Office, Munich, Germany.
Huawei et al., "Views on NR URLLC work in Rel-16",3GPP TSG RAN Meeting #80 RP-180889, La Jolla, USA, Jun. 11-14, 2018, Total 14 Pages.
3GPP TS 38.213 V15.2.0 (Jun. 2018); 3rd Generation Partnership Project; Technical Specification Group Radio Access Network; NR; Physical layer procedures for control (Release 15); total 99 pages.
Nokia et al., "NPRACH reliability enhancement in NB-IoT", 3GPP TSG RAN WG1 Meeting #93 R1-1806164, Busan, Korea, May 21-25, 2018, Total 2 Pages.
3GPP TS 38.214 V15.2.0 (Jun. 2018), 3rd Generation Partnership Project; Technical Specification Group Radio Access Network; NR; Physical layer procedures for data (Release 15), 95 pages.
Chinese Notice of Allowance issued in corresponding Chinese Application No. 201810887590.2, dated Jan. 15, 2021, pp. 1-5.
Chinese Office Action issued in corresponding Chinese Application No. 201810887590.2, dated Jun. 2, 2020, pp. 1-4.
Chinese Search Report issued in corresponding Chinese Application No. 201810887590.2, dated May 27, 2020, pp. 1-2.
International Search Report issued in corresponding International Application No. PCT/CN2019/099317, dated Oct. 17, 2019, pp. 1-9.

* cited by examiner

INFORMATION TRANSMISSION METHOD AND APPARATUS FOR SENDING OR RECEIVING JOINT INFORMATION OF UPLINK CONTROL INFORMATION

CROSS-REFERENCE TO RELATED APPLICATIONS

This application is a continuation of International Application No. PCT/CN2019/099317, filed on Aug. 5, 2019, which claims priority to Chinese Patent Application No. 201810887590.2, filed on Aug. 6, 2018. The disclosures of the aforementioned applications are hereby incorporated by reference in their entireties.

TECHNICAL FIELD

This application relates to the communications field, and more specifically, to an information transmission method and apparatus.

BACKGROUND

A fifth generation (the fifth generation, 5G) mobile communications system is committed to supporting higher system performance, and supporting a plurality of service types, different deployment scenarios, and a wider spectrum range. The plurality of service types include an enhanced mobile broadband (enhanced mobile broadband, eMBB) service, a massive machine type communication (massive machine type communication, mMTC) service, an ultra-reliable and low-latency communications (ultra-reliable and low-latency communications, URLLC) service, a multimedia broadcast multicast service (multimedia broadcast multicast service, MBMS), a positioning service, and the like. The different deployment scenarios include an indoor hotspot (Indoor hotspot) scenario, a dense urban (Dense Urban) scenario, a suburban scenario, an urban macro (Urban Macro) scenario, a high-speed railway scenario, and the like. The wider spectrum range indicates that 5G supports a spectrum range up to 100 GHz, and the spectrum range includes a low-frequency part below 6 GHz and a high-frequency part above 6 GHz and up to 100 GHz.

Although 5G new radio (new radio, NR) currently supports a URLLC service, an objective of the technical design is to design a unified solution (unified solution), and eMBB and URLLC are not distinguished technically. In design of uplink control information (uplink control information, UCI) feedback in NR, eMBB UCI and URLLC UCI are not distinguished. Particularly, NR supports UCI multiplexing (multiplexing). When a plurality of physical uplink control channels (physical uplink control channel, PUCCH) carrying different types of UCI overlap in time domain, a terminal device jointly encodes a plurality of different types of UCI, and then transmits the UCI on one PUCCH or one physical uplink shared channel (physical uplink shared channel, PUSCH). Consequently, a transmission latency or reliability of URLLC UCI cannot be ensured, and communication efficiency and user experience are severely affected.

SUMMARY

This application provides an information transmission method and apparatus, to ensure a latency requirement, a reliability requirement, and the like during transmission of third uplink control information with a relatively high priority. This ensures data transmission reliability of a high-priority service and improves communication efficiency, thereby improving user experience.

According to a first aspect, an information transmission method is provided. The method includes: obtaining, by a terminal device, a first uplink channel, where the first uplink channel is used to carry joint information of second uplink control information carried on a second channel and third uplink control information carried on a third uplink channel; and when the third uplink channel and the first uplink channel meet a first condition, sending, by the terminal device, the joint information on the first uplink channel; or when the third uplink channel and the first uplink channel do not meet a first condition, sending, by the terminal device, the third uplink control information on the third uplink channel, where the first condition includes at least one of the following conditions:

a distance between an ending symbol on the first uplink channel and an ending symbol on the third uplink channel is less than or equal to a first threshold; or a distance between a starting symbol on the first uplink channel and a starting symbol on the third uplink channel is less than or equal to a second threshold; or a difference between a coding rate of the first uplink channel and a coding rate of the third uplink channel is less than or equal to a third threshold.

According to the information transmission method provided in the first aspect, when the second uplink control information carried on the second channel and the third uplink control information carried on the third channel need to be multiplexed onto the first channel, the terminal device determines whether the third uplink channel and the first uplink channel meet the first condition; and when the first condition is met, the terminal device transmits the joint information of the second uplink control information and the third uplink control information on the first uplink channel; or when the third uplink channel and the first uplink channel do not meet the first condition, the terminal device transmits the third uplink control information on the third uplink channel. This can ensure a latency requirement, a reliability requirement, and the like during transmission of the third uplink control information with a relatively high priority. This ensures data transmission reliability of a high-priority service and improves communication efficiency, thereby improving user experience.

In a possible implementation of the first aspect, the second channel and the third channel meet a second condition, where the second condition includes any one of the following conditions:

the second uplink control information and/or the third uplink control information include/includes an acknowledgment ACK/a negative acknowledgment NACK, and a distance between an earliest symbol on the second uplink channel and the third uplink channel and an ending symbol on a physical downlink shared channel PDSCH corresponding to the ACK/NACK is greater than or equal to a fourth threshold; or the second uplink control information and/or the third uplink control information include/includes channel state information CSI scheduled by a physical downlink control channel PDCCH, and a distance between an earliest symbol on the second uplink channel and the third uplink channel and an ending symbol on the PDCCH corresponding to the CSI is greater than or equal to a fifth threshold; or the second uplink control information and/or the third uplink control information include/includes CSI scheduled by a PDCCH, and a distance between an earliest symbol on the second uplink channel and the third uplink channel and an ending symbol of a downlink reference signal corresponding to the CSI is greater than or equal to a sixth threshold.

In the implementation, whether to transmit the joint information is determined by using two determining conditions (the first condition and the second condition). In this way, a latency requirement, a reliability requirement, and the like of the third UCI may be further ensured when the joint information of the second UCI and the third UCI is transmitted on the first channel, and communication efficiency is further improved.

In a possible implementation of the first aspect, when the third uplink control information includes the acknowledgment ACK/negative acknowledgment NACK, a modulation and coding scheme table MCS table of the physical downlink shared channel PDSCH corresponding to the ACK/NACK is a first MCS table included in an MCS table set, where the MCS table set includes a plurality of MCS tables, and a spectrum efficiency corresponding to the first MCS table is less than a spectrum efficiency corresponding to another MCS table included in the MCS table set; or when the third uplink control information includes the acknowledgment ACK/negative acknowledgment NACK, a downlink control information DCI format corresponding to the ACK/NACK is a first DCI format included in a DCI format set, where the DCI format set includes a plurality of DCI formats, and a payload size corresponding to the first DCI format is less than a payload size corresponding to another DCI format included in the DCI format set; or when the third uplink control information includes the channel state information CSI, the CSI is aperiodic channel state information A-CSI that is triggered by the physical downlink control channel PDCCH and that is transmitted on a short-format physical uplink control channel PUCCH; or when the third uplink control information includes the channel state information CSI, a channel quality indicator table CQI table corresponding to the CSI is a first CQI table included in a CQI table set, where the CQI table set includes a plurality of CQI tables, and a spectrum efficiency corresponding to the first CQI table is less than a spectrum efficiency corresponding to another CQI table included in the CQI table set; or when the third uplink control information includes a first scheduling request SR, a period of the first SR is less than or equal to a seventh threshold; or when the third uplink control information includes a second scheduling request SR, a priority of a logical channel corresponding to the second SR is greater than or equal to an eighth threshold.

In the implementation, a service corresponding to the third UCI is determined as a URLLC service based on the foregoing condition, so that efficiency and accuracy of determining the service corresponding to the third UCI may be improved, communication resources may be saved, and communication efficiency may be further improved.

In a possible implementation of the first aspect, a third service corresponding to the third uplink control information is an ultra-reliable and low-latency communications URLLC service, and a second service corresponding to the second uplink control information is an enhanced mobile broadband eMBB service; and/or a latency requirement of a third service corresponding to the third uplink control information is higher than a latency requirement of a second service corresponding to the second uplink control information; and/or reliability of a third service corresponding to the third uplink control information is higher than reliability of a second service corresponding to the second uplink control information.

In the implementation, because the latency requirement or the reliability requirement of the third service corresponding to the third UCI is higher than that of the second service corresponding to the second UCI, when the second uplink control information carried on the second channel and the third uplink control information carried on the third channel need to be multiplexed onto the first channel, and when the first condition is met, the joint information of the second uplink control information and the third uplink control information is transmitted on the first uplink channel; or when the third uplink channel and the first uplink channel do not meet the first condition, the third uplink control information is transmitted on the third uplink channel. This can ensure a latency requirement, a reliability requirement, and the like during transmission of the third uplink control information with a relatively high priority. This ensures data transmission reliability of a high-priority service and improves communication efficiency, thereby improving user experience.

In a possible implementation of the first aspect, a value of the first threshold is any one of 0, two symbols, seven symbols, a half of a time domain length of the third uplink channel, or a time domain length of the third uplink channel.

In a possible implementation of the first aspect, a value of the second threshold is any one of 0, two symbols, seven symbols, or a period of the third uplink channel.

In a possible implementation of the first aspect, a value of the third threshold is 0 or 0.1.

According to a second aspect, an information transmission method is provided. The method includes: determining, by a network device, a first uplink channel, where the first uplink channel is used to carry joint information of second uplink control information carried on a second channel and third uplink control information carried on a third uplink channel; and when the third uplink channel and the first uplink channel meet a first condition, receiving, by the network device, the joint information on the first uplink channel; or when the third uplink channel and the first uplink channel do not meet a first condition, receiving, by the network device, the third uplink control information on the third uplink channel, where the first condition includes at least one of the following conditions:

a distance between an ending symbol on the first uplink channel and an ending symbol on the third uplink channel is less than or equal to a first threshold; or a distance between a starting symbol on the first uplink channel and a starting symbol on the third uplink channel is less than or equal to a second threshold; or a difference between a coding rate of the first uplink channel and a coding rate of the third uplink channel is less than or equal to a third threshold.

According to the information transmission method provided in the second aspect, a latency requirement, a reliability requirement, and the like during transmission of the third uplink control information with a relatively high priority can be ensured. This ensures data transmission reliability of a high-priority service and improves communication efficiency, thereby improving user experience.

In a possible implementation of the second aspect, the second channel and the third channel meet a second condition, where the second condition includes any one of the following conditions:

the second uplink control information and/or the third uplink control information include/includes an acknowledgment ACK/a negative acknowledgment NACK, and a distance between an earliest symbol on the second uplink channel and the third uplink channel and an ending symbol on a physical downlink shared channel PDSCH corresponding to the ACK/NACK is greater than or equal to a fourth threshold; or the second uplink control information and/or the third uplink control information include/includes channel state information CSI scheduled by a physical downlink control channel PDCCH, and a distance between an earliest symbol on the second uplink channel and the third uplink channel and an ending symbol on the PDCCH corresponding to the CSI is greater than or equal to a fifth threshold; or the second uplink control information and/or the third uplink control information include/includes CSI scheduled by a PDCCH, and a distance between an earliest symbol on the second uplink channel and the third uplink channel and an ending symbol of a downlink reference signal corresponding to the CSI is greater than or equal to a sixth threshold.

In a possible implementation of the second aspect, when the third uplink control information includes the acknowledgment ACK/negative acknowledgment NACK, a modulation and coding scheme table MCS table of the physical downlink shared channel PDSCH corresponding to the ACK/NACK is a first MCS table included in an MCS table set, where the MCS table set includes a plurality of MCS tables, and a spectrum efficiency corresponding to the first MCS table is less than a spectrum efficiency corresponding to another MCS table included in the MCS table set; or when the third uplink control information includes the acknowledgment ACK/negative acknowledgment NACK, a downlink control information DCI format corresponding to the ACK/NACK is a first DCI format included in a DCI format set, where the DCI format set includes a plurality of DCI formats, and a payload size corresponding to the first DCI format is less than a payload size corresponding to another DCI format included in the DCI format set; or when the third uplink control information includes the channel state information CSI, the CSI is aperiodic channel state information A-CSI that is triggered by the physical downlink control channel PDCCH and that is transmitted on a short-format physical uplink control channel PUCCH; or when the third uplink control information includes the channel state information CSI, a channel quality indicator table CQI table corresponding to the CSI is a first CQI table included in a CQI table set, where the CQI table set includes a plurality of CQI tables, and a spectrum efficiency corresponding to the first CQI table is less than a spectrum efficiency corresponding to another CQI table included in the CQI table set; or when the third uplink control information includes a first scheduling request SR, a period of the first SR is less than or equal to a seventh threshold; or when the third uplink control information includes a second scheduling request SR, a priority of a logical channel corresponding to the second SR is greater than or equal to an eighth threshold.

In a possible implementation of the second aspect, a third service corresponding to the third uplink control information is an ultra-reliable and low-latency communications URLLC service, and a second service corresponding to the second uplink control information is an enhanced mobile broadband eMBB service; and/or a latency requirement of a third service corresponding to the third uplink control information is higher than a latency requirement of a second service corresponding to the second uplink control information; and/or reliability of a third service corresponding to the third uplink control information is higher than reliability of a second service corresponding to the second uplink control information.

In a possible implementation of the second aspect, a value of the first threshold is any one of 0, two symbols, seven symbols, a half of a time domain length of the third uplink channel, or a time domain length of the third uplink channel.

In a possible implementation of the second aspect, a value of the second threshold is any one of 0, two symbols, seven symbols, or a period of the third uplink channel.

In a possible implementation of the second aspect, a value of the third threshold is 0 or 0.1.

According to a third aspect, an information transmission apparatus is provided. The apparatus has a function of implementing behavior of the terminal device in the foregoing method design. The function may be implemented by hardware, or may be implemented by hardware executing corresponding software. The hardware or the software includes one or more modules corresponding to the foregoing function. The modules may be software and/or hardware.

In a possible design, a structure of the terminal device includes a transmitter and a processor, where the processor is configured to support the terminal device in performing corresponding functions in the foregoing method. The transmitter is configured to: support communication between a network device and the terminal device, and send information or an instruction in the foregoing method to the network device. The terminal device may further include a memory. The memory is configured to couple to the processor, and the memory stores a program instruction and data that are necessary for the network device.

According to a fourth aspect, an information transmission apparatus is provided. The apparatus has a function of implementing behavior of the network device in the foregoing method design. The function may be implemented by hardware, or may be implemented by hardware executing corresponding software. The hardware or the software includes one or more modules corresponding to the foregoing function.

In a possible design, a structure of the network device includes a processor and a receiver, where the processor is configured to support the network device in performing corresponding functions in the foregoing method. The receiver is configured to: support communication between the network device and a terminal device, and receive information or an instruction sent by the terminal device in the foregoing method. The network device may further include a memory. The memory is configured to couple to the processor, and the memory stores a program instruction and data that are necessary for the network device.

According to a fifth aspect, a computer storage medium is provided, configured to store a computer software instruction used by the terminal device, and including a program designed for performing any one of the first aspect or the possible implementations of the first aspect.

According to a sixth aspect, a computer storage medium is provided, configured to store a computer software instruction used by the network device, and including a program designed for performing any one of the second aspect or the possible implementations of the second aspect.

According to a seventh aspect, a computer program product is provided. The computer program product includes a computer program. When being executed by a processor, the computer program is used to perform the method according to any one of the first aspect or the possible implementations of the first aspect, or perform the method according to any one of the second aspect or the possible implementations of the second aspect.

According to an eighth aspect, a chip system is provided. The chip system includes a processor, configured to support a terminal device in implementing functions in the foregoing aspects, for example, generating, receiving, determining, sending, or processing data and/or information in the foregoing method. In a possible design, the chip system further includes a memory. The memory is configured to store a program instruction and data that are necessary for the terminal device. The chip system may include a chip, or may include a chip and another discrete component.

According to a ninth aspect, a chip system is provided. The chip system includes a processor, configured to support a network device in implementing functions in the foregoing aspects, for example, generating, receiving, determining, sending, or processing data and/or information in the foregoing method. In a possible design, the chip system further includes a memory. The memory is configured to store a program instruction and data that are necessary for a terminal device. The chip system may include a chip, or may include a chip and another discrete component.

DESCRIPTION OF EMBODIMENTS

The following describes the technical solutions of this application with reference to the accompanying drawings.

The technical solutions of the embodiments of this application may be used in various communications systems, for example, a global system for mobile communications (global system for mobile communications, GSM) system, a code division multiple access (Code Division Multiple Access, CDMA) system, a wideband code division multiple access (Wideband Code Division Multiple Access, WCDMA) system, a general packet radio service (general packet radio service, GPRS) system, a long term evolution (Long Term Evolution, LTE) system, an LTE frequency division duplex (frequency division duplex, FDD) system, an LTE time division duplex (time division duplex, TDD) system, a universal mobile telecommunications system (Universal Mobile Telecommunication System, UMTS), a worldwide interoperability for microwave access (Worldwide Interoperability for Microwave Access, WiMAX) communications system, a future 5th generation (5th generation, 5G) system, or a new radio (new radio, NR) system.

Figure 1:
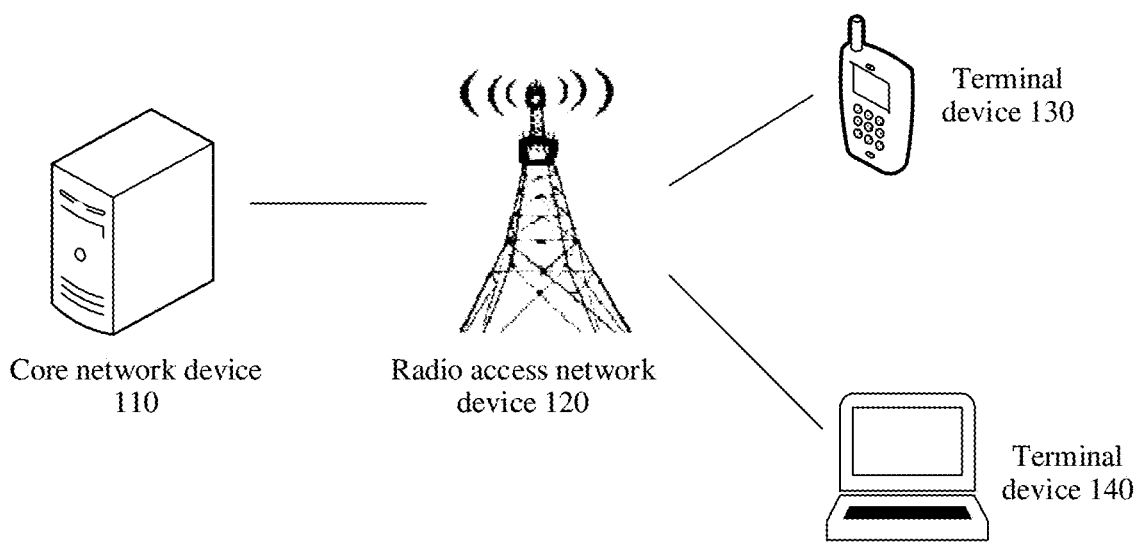
FIG. 1 is a schematic architectural diagram of a mobile communications system applicable to an embodiment of this application.

FIG. 1 is a schematic architectural diagram of a mobile communications system applicable to an embodiment of this application. As shown in FIG. 1, the mobile communications system 100 may include a core network device 110, a radio access network device 120, and at least one terminal device (for example, a terminal device 130 and a terminal device 140 shown in FIG. 1). The terminal device is connected to the radio access network device in a wireless manner, and the radio access network device is connected to the core network device in a wireless or wired manner. The core network device and the radio access network device may be different physical devices independent of each other, or a function of the core network device and a logical function of the radio access network device may be integrated into one physical device, or a part of functions of the core network device and a part of functions of the radio access network device may be integrated into one physical device. The terminal device may be at a fixed position, or may be mobile. FIG. 1 is merely a schematic diagram. The communications system may further include another network device, for example, may further include a wireless relay device and a wireless backhaul device, which are not drawn in FIG. 1. Quantities of core network devices, radio access network devices, and terminal devices included in the mobile communications system are not limited in the embodiments of this application.

The terminal device in the mobile communications system 100 may be user equipment (user equipment, UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may alternatively be a cellular phone, a cordless phone, a session initiation protocol (Session Initiation Protocol, SIP) phone, a wireless local loop (wireless local loop, WLL) station, a personal digital assistant (personal digital assistant, PDA), a handheld device with a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. In this application, the foregoing terminal device and a chip that can be used in the foregoing terminal device are collectively referred to as a terminal device. It should be understood that a specific technology and a specific device form that are used by the terminal device are not limited in the embodiments of this application.

In the mobile communications system 100, the radio access network device 120 is an access device that is connected to the mobile communications system by the terminal device in a wireless manner. The radio access network device 120 may be a base station, an evolved NodeB (evolved NodeB, base station), a home base station, an access point (access point, AP) in a wireless fidelity (wireless fidelity, Wi-Fi) system, a wireless relay node, a wireless backhaul node, a transmission point (transmission point, TP), a transmission reception point (transmission reception point, TRP), a gNB in an NR system, or a component or a part of a device included in a base station, for example, a central unit (central unit, CU), a distributed unit (distributed unit, DU), or a baseband unit (baseband unit, BBU). It should be understood that a specific technology and a specific device form used by the radio access network device are not limited in the embodiments of this application. In this application, the radio access network device is briefly referred to as a network device. Unless otherwise specified, in this application, all network devices are radio access network devices. In this application, the network device may be a network device, or may be a chip used in a network device to complete a wireless communication processing function.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing by using a process (process), for example, a Linux operating system, a Unix operating system, an Android operating system, an iOS operating system, or a windows operating system. The application layer includes applications such as a browser, an address book, word processing software, and instant communications software. In addition, a specific structure of an execution body of the method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be the terminal device, the network device, or a functional module that can invoke and execute the program in the terminal device or the network device.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry an instruction and/or data.

A 5G system is dedicated to supporting higher system performance and supporting a plurality of service types, different deployment scenarios, and a wider spectrum range. The plurality of service types include enhanced mobile broadband eMBB, mMTC, and URLLC. Compared with a 4G communications system, one of features is that support on a URLLC service is increased. There are a plurality of types of URLLC services. Typical examples include industrial control, industrial production process automation, human-machine interaction, telemedicine, and the like. To better quantize performance indexes of a URLLC service to provide a reference input and evaluation criterion for designing the 5G system, the performance indexes of the URLLC service are currently defined as follows:

Latency: A latency is defined as a transmission time required for a user application layer data packet from a service data unit (service data unit, SDU) at a radio protocol stack layer 2/layer 3 at a transmit end to an SDU at a radio protocol stack layer 2/layer 3 at a receive end. A user plane latency requirement of the URLLC service is 0.5 ms for both uplink and downlink transmission. The performance requirement of 0.5 ms herein is only applicable to a case in which neither a transmit end (for example, a base station) nor a receive end (for example, a terminal) is in a discontinuous reception (discontinuous reception, DRX) mode. In addition, the performance requirement of 0.5 ms herein means an average latency of the data packet, and is not bound to the following reliability requirement.

Reliability: A probability that X-bit data is correctly transmitted from a transmit end to a receive end within a specific time (L seconds), where the foregoing time (L seconds) is still defined as a transmission time required for a user application layer data packet from an SDU at a radio protocol stack layer 2/layer 3 at the transmit end to an SDU at a radio protocol stack layer 2/layer 3 at the receive end. For the URLLC service, a typical requirement is that reliability of sending data of 32-byte (bytes) within 1 ms needs to reach 99.999%. It should be noted that the foregoing performance indicator is merely a typical value, and a specific URLLC service may have a different requirement for reliability. For example, in extremely severe industrial control, a transmission success probability of 99.9999999% is required to be achieved within an end-to-end latency of 0.25 ms.

System capacity: A maximum cell throughput that a system can reach when interrupted users satisfy a specific proportion. The interrupted user herein is a user whose reliability requirement cannot be satisfied within a specific latency range.

First, UCI is briefly described.

The UCI in NR includes an acknowledgment (acknowledgement, ACK)/a negative acknowledgment (negative acknowledgement, NACK), channel state information (channel state information, CSI), and a scheduling request (scheduling request, SR). For URLLC UCI and eMBB UCI (UCI of different services), the UCI of each service can include only one type of information before joint coding. For example, the URLLC UCI may include any one of the ACK/NACK, the CSI, and the SR (where the ACK/NACK, the CSI, and the SR are UCI of different types).

A PUCCH resource (Resource) for the SR is configured, and may be in a PUCCH format (Format) 0/1. The PUCCH format includes a PUCCH format 0/1/2/3/4. The formats 0 and 1 are used to carry UCI of 1 to 2 bits (bit), for example, used to carry the SR or the ACK/NACK. The format 2/3/4 is used to carry UCI of more than 2 bits, including the ACK/NACK or the CSI.

A PUCCH resource carrying the ACK/NACK is generally scheduled and may be in the format 0/1/2/3/4. For the ACK/NACK of a dynamic physical downlink control channel (dynamic physical downlink shared channel, PDSCH), the PUCCH resource is scheduled. A slot in which the ACK/NACK is transmitted and a PUCCH resource on which the ACK/NACK is transmitted are scheduled by using downlink control information (downlink control information, DCI). For semi-persistent scheduling PDSCH (semi-persistent scheduling PDSCH, SPS PDSCH), a slot of the ACK/NACK is indicated by using the DCI, but the PUCCH resource is configured by a higher layer.

A PUCCH resource carrying the CSI is configured, and may be in a PUCCH format 2/3/4. Only periodic channel state information (periodic channel state information, P-CSI)/semi-persistent channel state information (semi-persistent channel state information, SP-CSI) may be transmitted on the PUCCH, and a corresponding PUCCH resource is configured by a higher layer. Aperiodic channel state information (aperiodic channel state information, A-CSI) may also be transmitted on the PUCCH, and a corresponding PUCCH resource is scheduled by using the DCI.

Currently, NR supports UCI multiplexing on PUCCHs that overlap in time domain. However, different from that in LTE, because lengths of the PUCCHs in NR are different, the PUCCHs may partially overlap (partially overlap). Therefore, a timeline (timeline) is defined when UCI multiplexing (multiplexing) is performed on a plurality of PUCCHs that overlap in time domain, and the UCI multiplexing is performed only when the timeline is met.

For the timeline defined in the protocol, because UCI on a plurality of PUCCHs that overlap in time domain may include different information, when the PUCCHs carrying the UCI of different types overlap in time domain, the following stipulations are made:

When a PUCCH carrying an SR and a PUCCH carrying CSI overlap, no timeline is required, joint coding transmission is always performed, and jointly coded information is transmitted on a PUCCH resource carrying the CSI.

When a PUCCH carrying an SR and a PUCCH carrying an ACK/NACK overlap, the multiplexing is performed only when a timeline A1 is met. The PUCCH carrying the ACK/NACK is in a format 2/format 3/format 4, joint coding transmission is performed when A1 is met, and jointly coded information is transmitted on a PUCCH resource carrying the ACK/NACK.

When a PUCCH carrying CSI and a PUCCH carrying an ACK/NACK overlap, joint coding transmission is performed only when a timeline A1 is met. For an ACK/NACK corresponding to a dynamic PDSCH, joint coding information is transmitted on the PUCCH carrying the ACK/NACK, and for an ACK/NACK corresponding to an SPS PDSCH, joint coding information is transmitted on the PUCCH carrying the CSI.

It should be noted that, if jointly coded UCI is transmitted on a PUCCH resource carrying the ACK/NACK, because the determining of the PUCCH resource carrying the ACK/NACK is associated with a payload size (payload size) of the UCI, the PUCCH resource may change due to a change of the payload size of the jointly coded UCI.

For a plurality of PUCCHs that overlap in time domain, if the following condition on the timeline is met, UCI on all overlapping PUCCHs is jointly encoded and then transmitted on one PUCCH:

Timeline A1: If there are one or more PUCCHs carrying an ACK/NACK, a distance between an earliest symbol of the PUCCH/PUCCHs and an ending symbol of a PDSCH/PDSCHs corresponding to the ACK/NACK is greater than or equal to N1+X.

Timeline A2: If a PUSCH overlaps with a PUCCH and the PUSCH is scheduled by uplink grant (UL Grant), a distance between an earliest symbol of a PUCCH/PUCCHs and a PUSCH/PUSCHs and an ending symbol of the UL grant is greater than or equal to N2+Y.

Values of N1 and N2 are related to a subcarrier spacing (subcarrier spacing, SCS) and capability of the terminal device. Generally, capabilities of one or more terminal devices, and values of N1 and N2 in capabilities of different terminal devices and different SCSs are defined in a protocol. Values of X and Y are related to a plurality of factors such as a PDSCH time domain configuration and whether an ACK/NACK needs to be carried on a PUSCH.

According to a current protocol, when multiplexing on UCI of services having different latency or reliability requirements is performed, UCI of a service having a high latency or reliability requirement may fail to meet a transmission requirement. For example, an ACK/NACK of URLLC may be urgently scheduled and overlap with a PUCCH carrying CSI of eMBB in time domain. A time domain position of the PUCCH carrying the CSI is before a time domain position of the PUCCH carrying the ACK/NACK. If a distance between a starting symbol on the PUCCH carrying the CSI and the PDSCH corresponding to the ACK/NACK does not meet the requirement of the timeline A1, the multiplexing is not performed. In this case, a behavior of the terminal device is not defined in the current protocol. To be specific, the terminal device may freely choose to send the ACK/NACK or send the CSI, or not send the ACK/NACK nor the CSI. A solution is as follows: If a URLLC service can be identified, an ACK/NACK of the URLLC is preferentially transmitted, and CSI transmission is not performed. This is certainly not a preferred approach. On the other hand, even if the distance between the starting symbol on the PUCCH carrying the CSI and the PDSCH corresponding to the ACK/NACK meets the requirement of the timeline A1, the multiplexing is performed, but when jointly coded information is transmitted on a new channel, because a coding rate or a time domain position of the new channel (which may not be a same channel as the PUCCH carrying the ACK/NACK) is different from that of the PUCCH carrying the ACK/NACK, a transmission characteristic of the ACK/NACK of the URLLC may be damaged, thereby prolonging a latency or reducing transmission reliability. Consequently, fast and reliable transmission of the ACK/NACK of the URLLC cannot be ensured. The communication efficiency is greatly reduced, and user experience is affected.

Based on the foregoing problem, this application provides an information transmission method. According to the method, when multiplexing on UCI of different services is performed, a latency and reliability requirement of UCI of a high-priority service during multiplexing can be ensured, data transmission reliability of the high-priority service can be ensured, and communication efficiency can be improved, thereby improving user experience.

Figure 2:
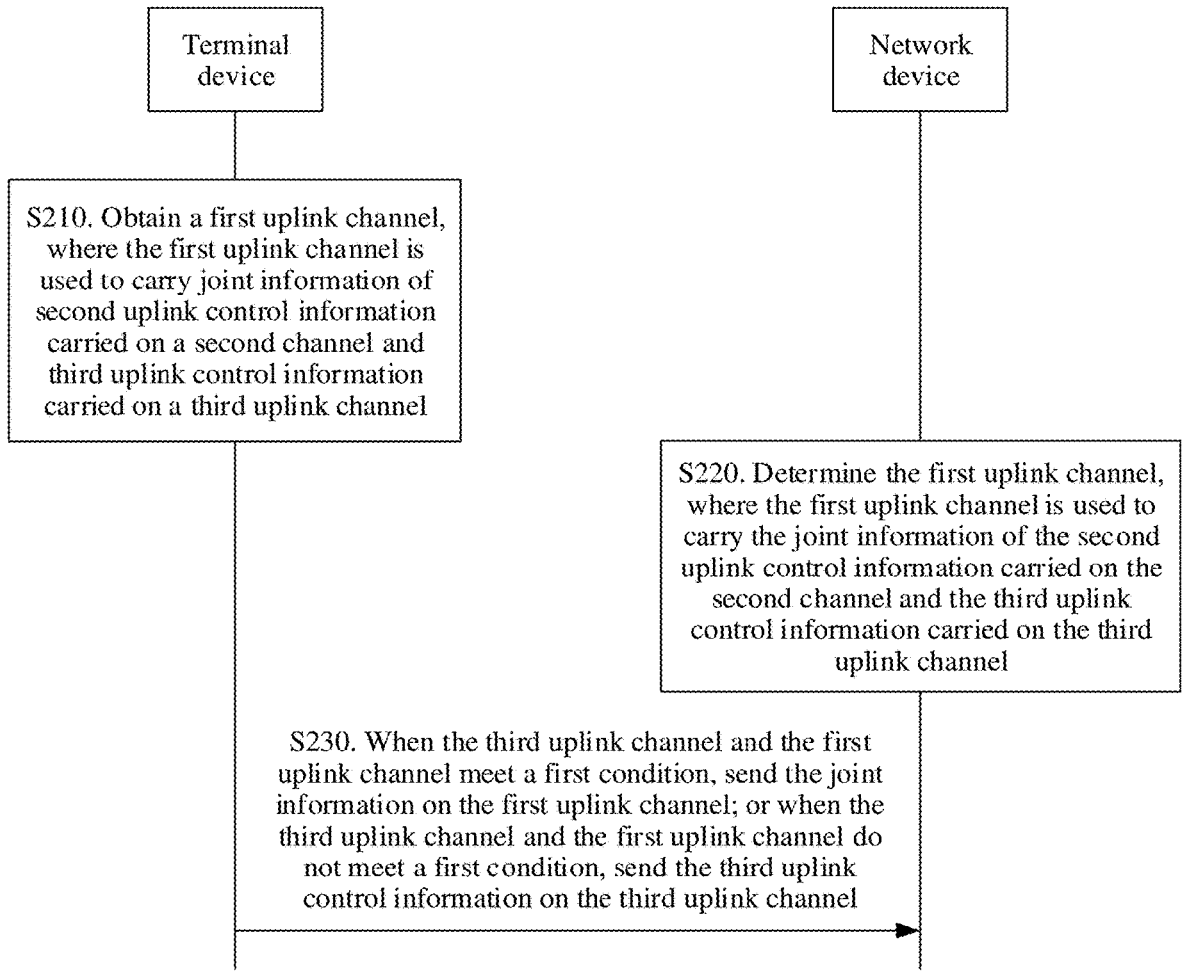
FIG. 2 is a schematic flowchart of an information transmission method according to an embodiment of this application.

The following describes in detail an information transmission method provided in this application with reference to FIG. 2. FIG. 2 is a schematic flowchart of an information transmission method 200 according to an embodiment of this application. The method 200 may be used in the scenario shown in FIG. 1, or certainly may be used in another communication scenario. This is not limited in this embodiment of this application.

It should be understood that in this embodiment of this application, the method 200 is described by using an example in which the method 200 is performed by a terminal device and a network device. By way of example, and not limitation, the method 200 may alternatively be performed by a chip used in the terminal device or the network device.

As shown in FIG. 2, the method 200 includes the following steps.

S210. The terminal device obtains a first uplink channel, where the first uplink channel is used to carry joint information of second uplink control information carried on a second channel and third uplink control information carried on a third uplink channel.

S220. The network device determines the first uplink channel.

S230. When the third uplink channel and the first uplink channel meet a first condition, the terminal device sends the joint information on the first uplink channel, and correspondingly, the network device receives the joint information on the first uplink channel; or when the third uplink channel and the first uplink channel do not meet a first condition, the terminal device sends the third uplink control information on the third uplink channel, and correspondingly, the network device sends the third uplink control information on the third uplink channel.

The first condition includes at least one of the following conditions:

a distance between an ending symbol on the first uplink channel and an ending symbol on the third uplink channel is less than or equal to a first threshold; or a distance between a starting symbol on the first uplink channel and a starting symbol on the third uplink channel is less than or equal to a second threshold; or a difference between a coding rate of the first uplink channel and a coding rate of the third uplink channel is less than or equal to a third threshold.

According to the information transmission method provided in this application, when the second uplink control information carried on the second channel and the third uplink control information carried on the third channel need to be multiplexed onto the first channel, whether the third uplink channel and the first uplink channel meet the first condition is determined; and when the first condition is met, the joint information of the second uplink control information and the third uplink control information is transmitted on the first uplink channel; or when the third uplink channel and the first uplink channel do not meet the first condition, the third uplink control information is transmitted on the third uplink channel. This can ensure a latency requirement, a reliability requirement, and the like during transmission of the third uplink control information with a relatively high priority. This ensures data transmission reliability of a high-priority service and improves communication efficiency, thereby improving user experience.

Specifically, in S210, if the terminal device needs to send UCI, because the terminal device may transmit UCI of different services, and the different services have different priorities or reliability requirements, when the terminal device sends UCI of a plurality of different services, the terminal device obtains information about each channel for transmitting the UCI of the service. In S220, correspondingly, the network device also determines the information about each channel for transmitting the UCI of the service, to determine to receive the information of the UCI on different channels.

For example, the terminal device and the network device may separately obtain (determine) a second uplink channel, for example, a second uplink control channel Specifically, second information of the second uplink channel is obtained, where the second uplink channel carries the second UCI, and the second information includes time-frequency resource information and/or coding rate information of the second uplink channel.

For example, the terminal device and the network device may further separately obtain (determine) third information of the third uplink channel, for example, a third uplink control channel. The third uplink channel carries the third UCI, and the third information includes time-frequency resource information and/or coding rate information of the third uplink channel. The second uplink channel and the third uplink channel overlap in time domain, and a service priority or a latency/reliability requirement corresponding to the third UCI is higher than a service priority or a latency/reliability requirement corresponding to the second UCI. Because the second uplink channel and the third uplink channel overlap in time domain, the terminal device determines whether multiplexing needs to be performed. If it is determined that the multiplexing needs to be performed, the terminal device selects the first uplink channel, and transmits, on the first uplink channel, the joint information of the second uplink control information carried on the second channel and the third uplink control information carried on the third channel. Correspondingly, the network device receives the joint information on the first uplink channel.

For example, the terminal device and the network device separately obtain the first channel. Specifically, the terminal device and the network device may separately obtain first information of the first channel. The first information includes time-frequency resource information, a coding rate, and/or the like of the first uplink channel.

Figure 3:
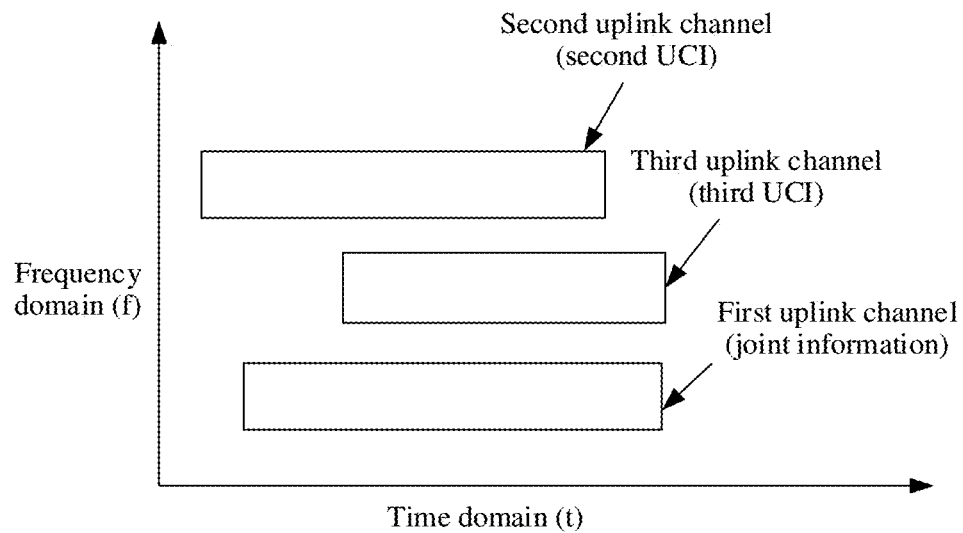
FIG. 3 is a schematic diagram of different uplink channels according to an embodiment of this application.

For example, FIG. 3 is a schematic diagram of different uplink channels according to an embodiment of this application. The first uplink channel carries the joint information of the second UCI carried on the second uplink channel and the third UCI carried on the third uplink channel. The second uplink channel and the third uplink channel overlap in time domain. The second uplink channel carries the second UCI, and the third uplink channel carries the third UCI. FIG. 3 shows a case in which time-frequency positions of the first uplink channel, the second uplink channel, and the second uplink channel are different.

In S230, after determining the resource information, the coding rates, and/or the like of the first uplink channel and the third uplink channel, the terminal device sends, based on the first condition, the joint information on the first uplink channel if the first uplink channel and the third uplink channel meet the first condition. If the first uplink channel and the third uplink channel do not meet the first condition, the terminal device sends the third UCI on the third uplink channel.

The first condition includes at least one of the following conditions:

a distance between an ending symbol on the first uplink channel and an ending symbol on the third uplink channel is less than or equal to a first threshold; or a distance between a starting symbol on the first uplink channel and a starting symbol on the third uplink channel is less than or equal to a second threshold; or a difference between a coding rate of the first uplink channel and a coding rate of the third uplink channel is less than or equal to a third threshold.

Specifically, in this embodiment of this application, the first threshold, the second threshold, and the third threshold are all positive numbers. The difference between the symbols of the channels may be understood as a difference between numbers of the symbols. There may be two understandings for that the first condition includes "a distance between an ending symbol on the first uplink channel and an ending symbol on the third uplink channel". The first understanding is an absolute value of the difference between the ending symbols (numbers of the ending symbols) on the two channels, and the second understanding is a difference obtained by subtracting the ending symbol (a number of the ending symbol) on the third uplink channel from the ending symbol (a number of the ending symbol) on the first uplink channel There may be two cases for the second understanding: Case 1: The ending symbol on the first uplink channel is earlier than or equal to the ending symbol on the third uplink channel. In this case, the difference obtained by subtracting the ending symbol (the number of the ending symbol) on the third uplink channel from the ending symbol (the number of the ending symbol) on the first channel is a negative value or 0. However, a value of the first threshold is a positive number. Therefore, when the ending symbol on the first uplink channel is earlier than or equal to the ending symbol on the third uplink channel, the first uplink channel and the third uplink channel meet the first condition. Case 2: When the ending symbol on the first uplink channel is later than the ending symbol on the third uplink channel, and the distance between the ending symbol on the first uplink channel and the ending symbol on the third uplink channel is less than or equal to the first threshold, the first uplink channel and the third uplink channel meet the first condition.

There may be two understandings for that the first condition includes "a distance between a starting symbol on the first uplink channel and a starting symbol on the third uplink channel". The first understanding is an absolute value of the difference between the starting symbols of the two channels, and the second understanding is a difference obtained by subtracting the starting symbol (a number of the starting symbol) on the first uplink channel from the starting symbol (a number of the starting symbol) on the third uplink channel. There may be two cases for the second understanding: Case 1: The starting symbol on the first uplink channel is equal to or later than the starting symbol on the third uplink channel. Case 2: The starting symbol (the number of the starting symbol) on the first uplink channel is earlier than the starting symbol (the number of the starting symbol) on the third uplink channel, and the distance between the starting symbol on the first uplink channel and the starting symbol on the third uplink channel is less than or equal to the second threshold.

There may also be two understandings for that the first condition includes "a difference between a coding rate of the first uplink channel and a coding rate of the third uplink channel". The first understanding is an absolute value of the difference between the coding rates of the two channels, and the second understanding is "a difference obtained by subtracting the coding rate of the first uplink channel from the coding rate of the third uplink channel". For the second understanding, there are two cases for the condition: Case 1: The coding rate of the first uplink channel is less than or equal to the coding rate of the third uplink channel Case 2: The coding rate of the first uplink channel is greater than the coding rate of the third uplink channel, and the difference between the coding rate of the first uplink channel and the coding rate of the third uplink channel is less than or equal to the third threshold.

When UCI transmission on the first uplink channel, the second uplink channel, and the third uplink channel is based on coding (for example, the UCI transmission on an uplink control channel in a format (format) 2/3/4 in NR is based on coding), a maximum coding rate of the uplink channel is configured by using a higher layer parameter, where the maximum coding rate is the foregoing coding rate. When UCI transmission on the first uplink channel, the second uplink channel, and the third uplink channel is not based on coding (for example, the UCI transmission is based on sequence selection, and for example, transmission on an uplink control channel in a format 0/1 in NR is based on sequence selection), a maximum coding rate of the uplink channel is not configured by using a higher layer parameter, and the foregoing coding rate may be understood as a default value. For example, the default value may be 0 (that is, the coding rate is 0).

Two conditions: "a distance between an ending symbol on the first uplink channel and an ending symbol on the third uplink channel is less than or equal to a first threshold" or "a distance between a starting symbol on the first uplink channel and a starting symbol on the third uplink channel is less than or equal to a second threshold" that are included in the first condition are used to determine whether there is an excessively large difference between time domain positions of the first channel and the third channel. Because the service priority or the latency/reliability requirement corresponding to the third UCI is higher than the service priority or the reliability corresponding to the second UCI, transmission of the third UCI needs to be preferentially ensured. For example, if the distance between the ending symbol (the last symbol or the ending symbol) on the first uplink channel and the ending symbol (the last symbol or the ending symbol) on the third uplink channel is less than or equal to the first threshold, or the distance between the starting symbol (the first symbol) on the first uplink channel and the starting symbol (the first symbol) on the third uplink channel is less than or equal to the second threshold, it is proved that there is no large difference between the time domain positions of the first uplink channel and the third uplink channel, that is, no additional latency is caused to the third UCI after the multiplexing is performed. In other words, the multiplexing is performed on the first uplink channel. Otherwise, because an extra latency is caused to transmission of the third UCI, a requirement on the transmission latency of the third UCI cannot be ensured. Therefore, the multiplexing is not performed, and the third UCI is transmitted on the original third uplink channel on which the third UCI is carried.

When the first condition includes that "a difference between a coding rate of the first uplink channel and a coding rate of the third uplink channel is less than or equal to a third threshold", if the first uplink channel and the third uplink channel meet the condition, it is proved that reliability of transmission of the third UCI does not decrease after the multiplexing is performed on the first uplink channel. Therefore, the multiplexing may also be performed on the first uplink channel Otherwise, the reliability of transmission of the third UCI cannot be ensured. Therefore, the multiplexing is not performed, and the third UCI is transmitted on the original third uplink channel on which the third UCI is carried.

It should be further understood that the first condition may further include another condition. For example, both the first uplink channel and the third uplink channel are short-format PUCCHs. Alternatively, both the first uplink channel and the third uplink channel are long-format PUCCHs, and a difference between durations (duration) of the PUCCHs is less than or equal to a predefined threshold. This is not limited in this application.

It should be understood that, in this embodiment of this application, the second uplink channel and the third uplink channel may be two PUCCHs (which are respectively referred to as a second PUCCH and a third PUCCH) that at least partially overlap in time domain. At least partial overlapping in time domain includes complete overlapping and partial overlapping. The first uplink channel may also be a PUCCH (a first PUCCH), and the first PUCCH may be either of the second PUCCH and the third PUCCH, or may be a PUCCH different from the second PUCCH and the third PUCCH (at least different in time domain resources). This is not limited in this application.

It should be further understood that, in this embodiment of this application, the second uplink channel and the third uplink channel may be two PUSCHs that at least partially overlap in time domain. Alternatively, one of the second uplink channel and the third uplink channel is a PUSCH, and the other is a PUCCH, where the PUSCH and the PUCCH at least partially overlap in time domain. The first uplink channel may be a PUCCH or a PUSCH. This is not limited in this application.

Examples are used below to describe the second uplink channel, the third uplink channel, the second UCI, and the third UCI in the embodiments of this application.

For example, both the second uplink channel and the third uplink channel are PUCCHs, the second uplink channel (the second PUCCH) and the third uplink channel (the third PUCCH) overlap in time domain, and the second uplink control information (the second UCI) and the third uplink control information (the third UCI) correspond to UCI of different services. The third UCI is URLLC UCI, and the second UCI is UCI of another type, for example, eMBB UCI.

For another example, the second UCI and the UCI of the third UCI correspond to different services and types, and a UCI type may be understood as a type of information included in UCI. For example, the third UCI is a URLLC ACK/NACK, and the second UCI is an eMBB SR or eMBB CSI. Alternatively, the third UCI is a URLLC SR, and the second UCI is an eMBB ACK/NACK or eMBB CSI. Alternatively, the third UCI is URLLC CSI, and the second UCI is an eMBB ACK/NACK or an eMBB SR.

For another example, UCI types of the third UCI and the second UCI are the same, but services corresponding to the UCI are different. For example, the third UCI and the second UCI are respectively a URLLC ACK/NACK and an eMBB ACK/NACK. Alternatively, the third UCI and the second UCI are respectively URLLC CSI and eMBB CSI.

For another example, if the second PUCCH and the third PUCCH are PUCCHs in a format 2/3/4, the second PUCCH and the third PUCCH each have a coding rate configuration, that is, a maximum coding rate configured by using a higher layer parameter. For another example, if the second PUCCH and the third PUCCH are PUCCHs in a format 0/1, UCI transmission is not based on coding, and the PUCCHs have no coding rate configuration. The coding rate may be understood as a default value. For example, the coding rate is 0.

It should be understood that the foregoing examples are merely examples, and should not constitute any limitation on the second uplink channel, the third uplink channel, the second UCI, and the third UCI in this application. For example, the second UCI and the third UCI may alternatively correspond to other services, and the second UCI and the third UCI may alternatively be of other types. This is not limited in this application.

Examples are used below to describe a relationship between the first uplink channel and the second uplink channel and a relationship between the first uplink channel and the third uplink channel in the embodiments of this application.

For example, if the third UCI is a URLLC SR, and the second UCI is eMBB CSI, the first PUCCH is the second PUCCH.

For example, if the third UCI is a URLLC SR, and the second UCI is an eMBB ACK/NACK, the first PUCCH may be a PUCCH (the second PUCCH) carrying the ACK/NACK, or may be a new PUCCH resource carrying the ACK/NACK and determined based on a payload size of jointly encoded UCI. In a special case, both the third PUCCH and the second PUCCH are in the format 1, and the first PUCCH may be the first PUCCH or the second PUCCH.

For example, if the third UCI is URLLC CSI, and the second UCI is eMBB CSI, the first PUCCH may be either of the third PUCCH and the second PUCCH, or may be a new PUCCH resource configured by a higher layer.

For example, if the third UCI is URLLC CSI, and the second UCI is an eMBB ACK/NACK, the first PUCCH may be a PUCCH (the second PUCCH) carrying the ACK/NACK, or may be a new PUCCH resource carrying the ACK/NACK and determined based on a payload size of jointly encoded UCI. In a special case, when a PDSCH corresponding to the eMBB ACK/NACK is an SPS PDSCH, the first PUCCH is the third PUCCH.

For example, if the third UCI is a URLLC ACK/NACK, and the second UCI is an eMBB SR, the first PUCCH may be the third PUCCH, or may be a new PUCCH resource carrying the ACK/NACK and determined based on a payload size of jointly encoded UCI. In a special case, both the third PUCCH and the second PUCCH are in the format 1, and the first PUCCH may be the third PUCCH or the second PUCCH.

For example, if the third UCI is a URLLC ACK/NACK, and the second UCI is eMBB CSI, the first PUCCH may be the third PUCCH, or may be a new PUCCH resource carrying the ACK/NACK and determined based on a payload size of jointly encoded UCI. In a special case, when a PDSCH corresponding to the URLLC ACK/NACK is an SPS PDSCH, the first PUCCH is the second PUCCH.

For example, if the third UCI is a URLLC ACK/NACK, and the second UCI is an eMBB ACK/NACK, the first PUCCH may be either of the third PUCCH and the second PUCCH, or may be a new PUCCH resource carrying the ACK/NACK and determined based on a payload size of jointly encoded UCI.

It should be understood that the foregoing examples are merely examples, and should not constitute any limitation on the first uplink channel, the second uplink channel, and the third uplink channel in this application.

The following describes a value range of the first threshold, a value range of the second threshold, and a value range of the third threshold. Details are as follows:

In an embodiment, the value of the first threshold is any one of 0, two symbols, seven symbols, a half of a time domain length of the third uplink channel, or a time domain length of the third uplink channel. For example, if the third uplink channel is a PUCCH of two symbols (symbol), the first threshold is two symbols or one symbol.

It should be understood that, in the embodiments of this application, the symbol is also referred to as a time domain symbol, and may be an orthogonal frequency division multiplexing (orthogonal frequency division multiplexing, OFDM) symbol or a single carrier frequency division multiple access (single carrier frequency division multiple access, SC-FDMA) symbol, where SC-1-DMA is also referred to as orthogonal frequency division multiplexing with transform precoding (orthogonal frequency division multiplexing with transform precoding, OFDM with TP).

In an embodiment, a value of the second threshold is any one of 0, two symbols, seven symbols, or a period of the third uplink channel.

In an embodiment, a value of the third threshold is 0 or 0.1.

In an embodiment, if N potential maximum coding rates in total are configured for the PUCCH format 2/3/4 by the higher layer, and the coding rates are numbered n=1, 2, ..., N in ascending order, when the third PUCCH and the first PUCCH are both in the PUCCH format 2/3/4, the third threshold may be a difference between numbers of coding rates, and the value of the third threshold may be 0, 1, or 2.

It should be understood that the foregoing values of the first threshold, the second threshold, and the third threshold are all considered from a perspective of relative values. In this embodiment of this application, an absolute value of any one of the ending symbol, the starting symbol, and the coding rate of the first PUCCH may be further used for limitation. For example, the number of the ending symbol on the first PUCCH is less than or equal to X1, the number of the starting symbol is greater than or equal to X2, and the coding rate is less than or equal to X3. X1 and X2 are positions of symbols, and X3 is a value of the coding rate.

Optionally, in an embodiment, the second channel and the third channel further need to meet a second condition, where the second condition includes any one of the following conditions:

the second uplink control information and/or the third uplink control information include/includes an acknowledgment ACK/a negative acknowledgment NACK, and a distance between an earliest symbol on the second uplink channel and the third uplink channel and an ending symbol on a physical downlink shared channel PDSCH corresponding to the ACK/NACK is greater than or equal to a fourth threshold; or the second uplink control information and/or the third uplink control information include/includes channel state information CSI scheduled by a physical downlink control channel PDCCH, and a distance between an earliest symbol on the second uplink channel and the third uplink channel and an ending symbol on the PDCCH corresponding to the CSI is greater than or equal to a fifth threshold; or the second uplink control information and/or the third uplink control information include/includes CSI scheduled by a PDCCH, and a distance between an earliest symbol on the second uplink channel and the third uplink channel and an ending symbol of a downlink reference signal corresponding to the CSI is greater than or equal to a sixth threshold.

Specifically, the second uplink channel carries the second UCI, the third uplink channel carries the third UCI, and the second uplink channel and the third uplink channel overlap in time domain. Therefore, whether the joint information of the second UCI and the third UCI needs to be transmitted. In other words, whether the second UCI and the third UCI need to be jointly encoded and transmitted is determined. Therefore, when whether the second UCI and the third UCI need to be jointly encoded and transmitted is determined, a second determining condition (the second condition) may be further introduced. If the second condition is not met, the second UCI and the third UCI do not need to be multiplexed. If the second condition is met, the second UCI and the third UCI need to be multiplexed. When the second UCI and the third UCI need to be multiplexed, based on the first condition, whether to transmit the joint information of the second UCI and the third UCI on the first uplink channel is further determined, and if the first condition is met, the joint information of the second UCI and the third UCI is transmitted on the first uplink channel. If the first condition is not met, the joint information of the second UCI and the third UCI is not transmitted on the first uplink channel. However, the third UCI is transmitted on the third uplink channel, and transmission of the second UCI is muted on the second uplink channel That is, when the first condition and the second condition are met, the joint information of the second UCI and the third UCI is transmitted on the first uplink channel. When at least one of the first condition and the second condition is not met, the joint information of the second UCI and the third UCI is not transmitted on the first uplink channel.

According to the information transmission method provided in this embodiment of this application, two determining conditions are used to determine whether to transmit the joint information, to further ensure a latency requirement, a reliability requirement, and the like of the third UCI when the joint information of the second UCI and the third UCI is transmitted on the first channel. Further, communication efficiency is improved.

The following describes the second condition in detail.

Figure 4:
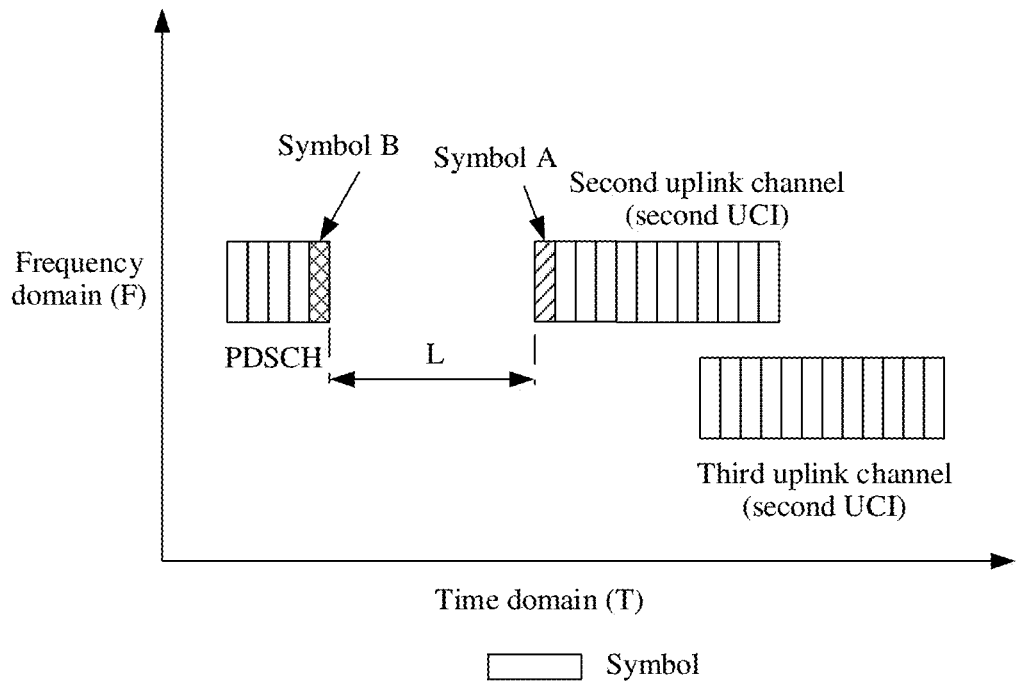
FIG. 4 is a schematic diagram of different uplink channels according to another embodiment of this application.

For example, the second UCI and/or the UCI include/includes the acknowledgment ACK/negative acknowledgment NACK, and the distance between the earliest symbol on the second uplink channel and the third uplink channel and the ending symbol on the physical downlink shared channel PDSCH corresponding to the ACK/NACK is greater than or equal to the fourth threshold. Descriptions are provided by using an example shown in FIG. 4. FIG. 4 is a schematic diagram of different uplink channels according to an embodiment of this application. In FIG. 4, the second UCI carried on the second uplink channel includes an ACK/NACK, and the third UCI carried on the third uplink channel includes an SR. Certainly, the third UCI may also include CSI or an ACK/NACK. A time domain position of the second uplink channel is before a time domain position of the third uplink channel, the second uplink channel and the third uplink channel each include a plurality of symbols in time domain, and a symbol A is the earliest symbol on the second uplink channel and the third uplink channel A PDSCH corresponding to the ACK/NACK also includes a plurality of symbols. A symbol B is an ending symbol on the PDSCH corresponding to the ACK/NACK. A distance between the symbol B and the symbol A is L. A value of the fourth threshold may be N1+X, and a value of N1 is related to a subcarrier spacing (subcarrier spacing, SCS) and capability of the terminal device. Values of X and Y are related to a plurality of factors such as a PDSCH time domain configuration and whether the ACK/NACK needs to be carried on a PUSCH.

For example, the second uplink control information and/or the third uplink control information include/includes the channel state information CSI scheduled by the physical downlink control channel PDCCH, and the distance between the earliest symbol on the second uplink channel and the third uplink channel and the ending symbol on the PDCCH corresponding to the CSI is greater than or equal to the fifth threshold.

For example, the second uplink control information and/or the third uplink control information include/includes the CSI scheduled by the PDCCH, and the distance between the earliest symbol on the second uplink channel and the third uplink channel and the ending symbol of the downlink reference signal corresponding to the CSI is greater than or equal to the sixth threshold.

Specifically, because the CSI is CSI scheduled by the PDCCH, it is proved that the CSI is A-CSI. When scheduling transmission of the A-CSI, a network side first sends a PDCCH (that is, sends DCI) to the terminal device, where the PDCCH is used to schedule the A-CSI. After the PDCCH is sent, a downlink reference signal used to demodulate and estimate the A-CSI is sent to the terminal device. The terminal device performs channel estimation based on the PDCCH and the downlink reference signal, and feeds back the A-CSI to the network device.

Figure 5:
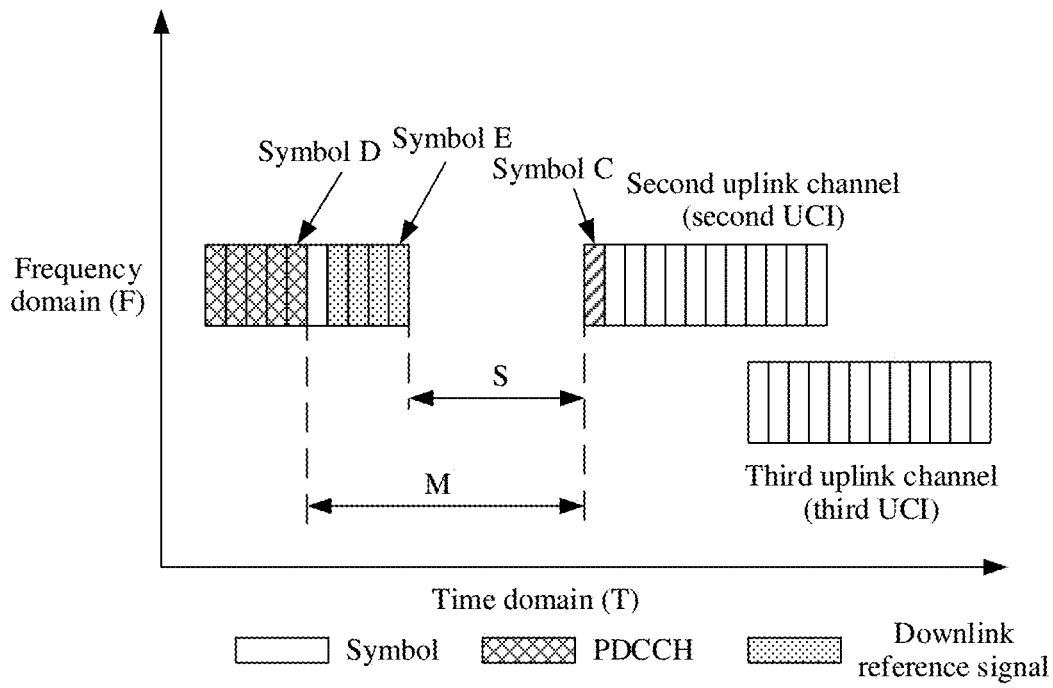
FIG. 5 is a schematic diagram of different uplink channels according to another embodiment of this application.

Descriptions are provided by using an example shown in FIG. 5. FIG. 5 is a schematic diagram of different uplink channels according to an embodiment of this application. In FIG. 5, the second UCI carried on the second uplink channel includes CSI scheduled by a PDCCH. The third UCI carried on the third uplink channel includes an ACK/NACK. Certainly, the third UCI may also include CSI or an SR. A time domain position of the second uplink channel is before a time domain position of the third uplink channel, the second uplink channel and the third uplink channel each include a plurality of symbols in time domain, and a symbol C is the earliest symbol on the second uplink channel and the third uplink channel. An ending symbol on the PDCCH corresponding to the CSI is a symbol D. An ending symbol of a downlink reference signal corresponding to the CSI is a symbol E. A distance between the symbol C and the symbol E is S, and a distance between the symbol C and the symbol D is M. That is, S should be greater than or equal to the sixth threshold, and M should be greater than or equal to the fifth threshold.

For the A-CSI scheduled by using the DCI, the DCI also indicates sending of a reference signal (reference signal, RS) of the A-CSI, and the terminal device obtains the A-CSI through measurement based on the A-CSI-RS. The A-CSI-RS includes a non-zero power CSI-RS (non-zero power CSI-RS, NZP-CSI-RS) used for channel measurement, a zero power (zero power CSI-RS, ZP-CSI-RS) and/or an NZP-CSI-RS used for interference measurement. Because the terminal device needs to perform CSI measurement for a specific time, a distance between a last ending symbol of all involved A-CSI-RSs and an earliest starting symbol on a PUCCH carrying the A-CSI needs to be greater than or equal to the measurement time (the sixth threshold) of the terminal device.

In an embodiment, for the fifth threshold and the sixth threshold, a processing time of the terminal device is related to a quantity of CSI reports (report) included in the A-CSI. In a possible implementation, the A-CSI includes only one report, and the report is broadband CSI measurement. In this case, parameters Z and Z' are introduced to indicate a preparation time and a measurement time of the A-CSI, that is, indicate the fifth threshold and the sixth threshold respectively. Table 1 lists a case of possible values of Z and Z'. It can be learned that values of Z and Z' are different for different subcarrier widths.

TABLE 1

| Subcarrier width | Low-latency A-CSI | |
|---|---|---|
| | Z (fifth threshold, unit: symbol) | Z' (sixth threshold, unit: symbol) |
| 15 kHz | 10 or 9 | 8 or 7 |
| 30 kHz | 13 | 11 |

TABLE 1-continued

| Subcarrier width | Low-latency A-CSI | |
|---|---|---|
| | Z (fifth threshold, unit: symbol) | Z' (sixth threshold, unit: symbol) |
| 60 kHz | 25 | 21 |
| 120 kHz | 43 | 36 |

It should be understood that FIG. 4, FIG. 5, and Table 1 are merely examples, and should not constitute any limitation on the second uplink channel, the third uplink channel, the second UCI, the third UCI, the fifth threshold, and the sixth threshold in this application. For example, the second uplink channel and the third uplink channel each may further include more symbols, and a time domain position relationship between the second uplink channel and the third uplink channel may alternatively be another time domain relationship. This is not limited in this embodiment of this application.

It should be further understood that the second condition may further include another condition used to determine a time domain position relationship between the first uplink channel and the second uplink channel. This is not limited in this embodiment of this application.

In an embodiment, a third service corresponding to the third UCI is an ultra-reliable and low-latency communications URLLC service, and a second service corresponding to the second UCI is an enhanced mobile broadband eMBB service; and/or a latency requirement of a third service corresponding to the third UCI is higher than a latency requirement of a second service corresponding to the second UCI; and/or reliability of a third service corresponding to the third UCI is higher than reliability of a second service corresponding to the second UCI.

Specifically, when the third uplink channel and the first uplink channel meet the first condition, the joint information is sent on the first uplink channel, or when the third uplink channel and the first uplink channel do not meet the first condition, the third uplink control information is sent on the third uplink channel. That is, in either of the cases, transmission of the third UCI needs to be ensured. Therefore, the latency requirement of the third service corresponding to the third UCI is higher than the latency requirement of the second service corresponding to the second UCI. That is, a value of a latency required by the third service corresponding to the third UCI is less than a value of a latency required by the second service corresponding to the second UCI. For example, the value of the latency required by the third service corresponding to the third UCI is 0.5 ms, and the value of the latency required by the second service corresponding to the second UCI is 0.8 ms.

The reliability of the third service corresponding to the third UCI is higher than the reliability of the second service corresponding to the second UCI. For example, a reliability requirement of the third service is that a success probability of sending data of 32 bytes (bytes) within 1 ms reaches 99.999%, and a reliability requirement of the third service is that a success probability of sending data of 32 bytes (bytes) within 1 ms reaches 99%.

In an embodiment, the third service corresponding to the third UCI is a URLLC service, and the second service corresponding to the second UCI is an eMBB service.

It should be understood that, in this embodiment of this application, the third service corresponding to the third UCI may alternatively be another service, and the second service corresponding to the second UCI may alternatively be another service, provided that a priority, the latency requirement, or the reliability requirement of the third service corresponding to the third UCI is higher than that of the second service corresponding to the second UCI. This is not limited in this embodiment of this application.

According to the information transmission method provided in this embodiment of this application, because the latency requirement or the reliability requirement of the third service corresponding to the third UCI is higher than that of the second service corresponding to the second UCI, when the second uplink control information carried on the second channel and the third uplink control information carried on the third channel need to be multiplexed onto the first channel, and when the first condition is met, the joint information of the second uplink control information and the third uplink control information is transmitted on the first uplink channel; or when the third uplink channel and the first uplink channel do not meet the first condition, the third uplink control information is transmitted on the third uplink channel. This can ensure the latency requirement, the reliability requirement, and the like during transmission of the third uplink control information with a relatively high priority. This ensures data transmission reliability of a high-priority service and improves communication efficiency, thereby improving user experience.

The following describes the third uplink control information in detail.

In an embodiment, when the third uplink control information includes the acknowledgment ACK/negative acknowledgment NACK, a modulation and coding scheme table MCS table of the physical downlink shared channel PDSCH corresponding to the ACK/NACK is a first MCS table included in an MCS table set, where the MCS table set includes a plurality of MCS tables, and a spectrum efficiency corresponding to the first MCS table is less than a spectrum efficiency corresponding to another MCS table included in the MCS table set; or when the third uplink control information includes the acknowledgment ACK/negative acknowledgment NACK, a downlink control information DCI format corresponding to the ACK/NACK is a first DCI format included in a DCI format set, where the DCI format set includes a plurality of DCI formats, and a payload size corresponding to the first DCI format is less than a payload size corresponding to another DCI format included in the DCI format set; or when the third uplink control information includes the channel state information CSI, the CSI is aperiodic channel state information A-CSI that is triggered by the physical downlink control channel PDCCH and that is transmitted on a short-format physical uplink control channel PUCCH; or when the third uplink control information includes the channel state information CSI, a channel quality indicator table CQI table corresponding to the CSI is a first CQI table included in a CQI table set, where the CQI table set includes a plurality of CQI tables, and a spectrum efficiency corresponding to the first CQI table is less than a spectrum efficiency corresponding to another CQI table included in the CQI table set; or when the third uplink control information includes a first scheduling request SR, a period of the first SR is less than or equal to a seventh threshold; or when the third uplink control information includes a second scheduling request SR, a priority of a logical channel corresponding to the second SR is greater than or equal to an eighth threshold.

First, a modulation and coding scheme table (modulation and coding scheme table, MCS table) and a channel quality indicator table (Channel Quality Indicator table, CQI table) are briefly described.

The terminal device measures a CSI-RS to obtain channel information, and feeds back the CSI to the network device. The CSI includes a channel quality indicator (channel quality indicator, CQI). Three CQI tables are configured in NR, and each table includes four columns and 16 rows. A first column is a CQI index (index), and a second column, a third column, and a fourth column are a modulation scheme (modulation scheme Mod), a coding rate (code rate, CR), and a spectrum efficiency (spectrum efficiency, SE) respectively. The 16 rows correspond to CQI index values 0 to 15, where 0 corresponds to an index that is out of range (out of range, OOR), and 1 to 15 correspond to 15 (Mod, CR) combinations and corresponding SEs. Among the three tables, two CQI tables are original tables in LTE and the other table is a new CQI table. Compared with the original two CQI tables, an SE corresponding to the new CQI table is lower, and may indicate transmission at a lower bit rate, to transmit a URLLC service with high reliability. In addition, a target block error rate (block error rate, BLER) corresponding to the new CQI table is also lower, to ensure high reliability of URLLC.

The MCS table is similar to the CQI table. Three MCS tables are configured in NR for downlink data transmission. Each table has four columns and 32 rows. The four columns are an MCS index, Mod, a CR, and an SE, respectively. The 32 rows correspond to MCS index values 0 to 31 in sequence, and except that some rows are reserved, other rows each correspond to a (Mod, CR) combination and a corresponding SE. In the three tables, two tables are specific to eMBB and are original MCS tables, and one table is specific to URLLC and is a new MCS table. Similarly, different from the two original MCS tables, the new MCS table corresponds to a lower SE, and may indicate transmission at a lower bit rate, and may be used to ensure high reliability of URLLC.

Therefore, when the third UCI includes the CSI, and the CQI table corresponding to the CSI is the first CQI table included in the CQI table set, the CQI table set may be a set including all CQI tables supported by the terminal device. The CQI table set includes a plurality of CQI tables. The spectrum efficiency corresponding to the first CQI table is less than the spectrum efficiency corresponding to the another CQI table included in the CQI table set. That is, the spectrum efficiency corresponding to the first CQI table is less than the spectrum efficiency corresponding to the another CQI table supported by the terminal device. In other words, the first CQI table is a new CQI table. In this case, it can be proved that the service corresponding to the third UCI is URLLC. That is, the service corresponding to the third UCI is a service with a high latency requirement or a high reliability requirement. Certainly, if a target block error rate corresponding to the first CQI table is less than a target block error rate corresponding to the another CQI table included in the CQI table set, it may also be determined that the service corresponding to the third UCI is URLLC.

Alternatively, when the third uplink control information includes the acknowledgment ACK/NACK, and the modulation and coding scheme table MCS table of the PDSCH corresponding to the ACK/NACK is the first MCS table included in the MCS table set, the MCS table set is a set including all MCS tables supported by the terminal device. The MCS table set includes a plurality of MCS tables. If the spectrum efficiency corresponding to the first MCS table is less than the spectrum efficiency corresponding to the another MCS table included in the MCS table set, it can be proved that the first MCS table is a new MCS table. In other words, it is proved that the service corresponding to the third UCI is URLLC.

Alternatively, in some cases, if a new radio network temporary identifier (radio network temporary identity, RNTI) is configured, because DCI is scrambled by using the new RNTI, the terminal device may identify the DCI by using the new RNTI, and determine an MCS table used for data transmission scheduled by using the DCI; and when the terminal device determines that the MCS table is a new MCS table, it may also be determined that the service corresponding to the third UCI is URLLC.

Alternatively, when the third uplink control information includes the ACK/NACK, and the PDSCH corresponding to the ACK/NACK is scheduled by using DCI, the DCI format is the first DCI format included in the DCI format set, and the DCI format set is a set including all DCI formats supported by the terminal device. The DCI format set includes a plurality of DCI formats, and the payload size corresponding to the first DCI format is less than the payload size corresponding to the another DCI format included in the DCI format set, that is, the DCI is compact DCI (Compact DCI). The compact DCI is DCI dedicated for scheduling URLLC, and a payload size (payload size) of the compact DCI is the smallest in all pieces of DCI for scheduling data. Therefore, it may also be determined that the service corresponding to the third UCI is URLLC.

Alternatively, when the third uplink control information includes the CSI, the CSI is A-CSI that is triggered (scheduled) by using DCI on the PDCCH and that is transmitted on the short-format PUCCH.

Alternatively, when the third UCI includes the first SR, a shorter period of the SR indicates a higher latency requirement of a service corresponding to the SR. Therefore, when the period of the first SR is less than or equal to a threshold (the seventh threshold), it may also be determined that the service corresponding to the third UCI is URLLC.

Alternatively, when the third uplink control information includes the second SR, the priority of the logical channel corresponding to the second SR is greater than or equal to the eighth threshold. A higher priority of the logical channel indicates a higher priority of corresponding data. Therefore, when the priority of the logical channel corresponding to the second SR is greater than or equal to a threshold (the eighth threshold), it may also be determined that the service corresponding to the third UCI is URLLC.

Alternatively, when the third UCI includes a third SR, and an SR configuration index corresponding to the third SR is less than or equal to a ninth threshold, it may also be determined that the service corresponding to the third UCI is URLLC.

Alternatively, when the third UCI includes a fourth SR, and an SR configuration index corresponding to the fourth SR is greater than or equal to a tenth threshold, it may also be determined that the service corresponding to the third UCI is URLLC.

In this embodiment of this application, the service corresponding to the third UCI is determined to be URLLC based on the foregoing conditions, so that efficiency and accuracy of determining the service corresponding to the third UCI can be improved, communication resources can be saved, and communication efficiency can be further improved.

It should be understood that in this embodiment of this application, in addition to the foregoing several conditions, another determining condition may also be used to determine that the service corresponding to the third UCI is URLLC. This is not limited in this embodiment of this application.

It should be further understood that, in the embodiments of this application, "first", "second", and the like are merely intended to indicate that a plurality of objects are different. For example, the first uplink channel and the second uplink channel are merely used to represent different channels, but should not cause any impact on the channel. The foregoing first, second, and the like should not impose any limitation on the embodiments of this application.

It should be further understood that the foregoing descriptions are merely intended to help a person skilled in the art better understand the embodiments of this application, but are not intended to limit the scope of the embodiments of this application. It is clear that a person skilled in the art may make various equivalent modifications or changes based on the foregoing examples. For example, in the foregoing method 200, some steps may be unnecessary or some steps may be newly added. Alternatively, any two or more of the foregoing embodiments may be combined. Such a modified, changed, or combined solution also falls within the scope of the embodiments of this application.

It should be further understood that, the foregoing descriptions of the embodiments of this application focus on a difference between the embodiments. For same or similar parts that are not mentioned, refer to each other. For brevity, details are not described herein again.

It should be further understood that sequence numbers of the foregoing processes do not mean execution sequences. The execution sequences of the processes should be determined based on functions and internal logic of the processes, and should not be construed as any limitation on the implementation processes of the embodiments of this application.

It should be understood that division of manners, cases, types, and embodiments in the embodiments of this application are merely for ease of description, but should not constitute any special limitation, and features in various manners, types, cases, and embodiments may be combined when there is no contradiction.

It should be further understood that in the embodiments of this application, "presetting" and "predefinition" may be implemented by prestoring, in a device (including, for example, a terminal device and a network device), corresponding code, a corresponding table, or another manner that may be used to indicate related information. A specific implementation is not limited in this application.

The foregoing describes in detail the information transmission method in the embodiments of this application with reference to FIG. 1 to FIG. 5. The following describes in detail the communications apparatuses in the embodiments of this application with reference to FIG. 6 to FIG. 9.

Figure 6:
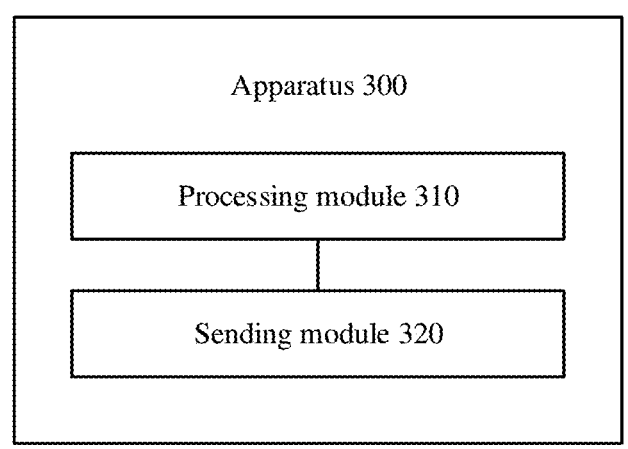
FIG. 6 is a schematic block diagram of an information transmission apparatus according to an embodiment of this application.
Figure 7:
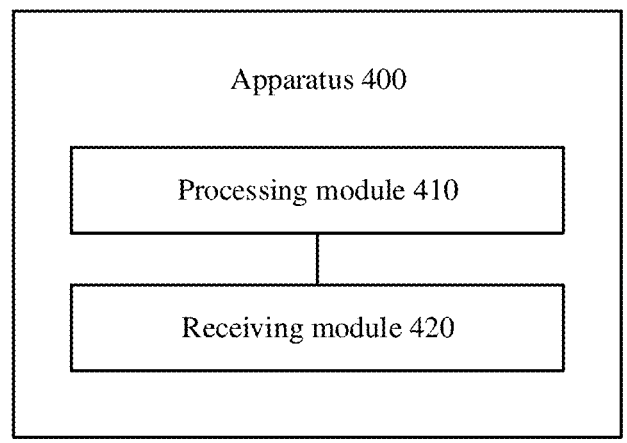
FIG. 7 is a schematic block diagram of an information transmission apparatus according to another embodiment of this application.

FIG. 6 is a schematic block diagram of an information transmission apparatus 300 according to an embodiment of this application. The apparatus 300 may correspond to the terminal device described in the foregoing method 200, or may be a chip or a component used in a terminal device, and each module or unit in the apparatus 300 is configured to perform each action or processing process performed by the terminal device in the foregoing method 200. As shown in FIG. 7, the apparatus 300 may include a processing module 310 and a sending module 320.

The processing module 310 is configured to obtain a first uplink channel, where the first uplink channel is used to carry joint information of second uplink control information carried on a second channel and third uplink control information carried on a third uplink channel; and the sending module 320 is configured to: when the third uplink channel and the first uplink channel obtained by the processing module 310 meet a first condition, send the joint information on the first uplink channel; or when the third uplink channel and the first uplink channel do not meet a first condition, send the third uplink control information on the third uplink channel, where the first condition includes at least one of the following conditions:

a distance between an ending symbol on the first uplink channel and an ending symbol on the third uplink channel is less than or equal to a first threshold; or a distance between a starting symbol on the first uplink channel and a starting symbol on the third uplink channel is less than or equal to a second threshold; or a difference between a coding rate of the first uplink channel and a coding rate of the third uplink channel is less than or equal to a third threshold.

According to the information transmission apparatus provided in this application, when the second uplink control information carried on the second channel and the third uplink control information carried on the third channel need to be multiplexed onto the first channel, whether the third uplink channel and the first uplink channel meet the first condition is determined; and when the first condition is met, the joint information of the second uplink control information and the third uplink control information is transmitted on the first uplink channel; or when the third uplink channel and the first uplink channel do not meet the first condition, the third uplink control information is transmitted on the third uplink channel. This can ensure a latency requirement, a reliability requirement, and the like during transmission of the third uplink control information with a relatively high priority. This ensures data transmission reliability of a high-priority service and improves communication efficiency, thereby improving user experience.

Optionally, in an embodiment, the second channel and the third channel meet a second condition, where the second condition includes any one of the following conditions:

the second uplink control information and/or the third uplink control information include/includes an acknowledgment ACK/a negative acknowledgment NACK, and a distance between an earliest symbol on the second uplink channel and the third uplink channel and an ending symbol on a physical downlink shared channel PDSCH corresponding to the ACK/NACK is greater than or equal to a fourth threshold; or the second uplink control information and/or the third uplink control information include/includes channel state information CSI scheduled by a physical downlink control channel PDCCH, and a distance between an earliest symbol on the second uplink channel and the third uplink channel and an ending symbol on the PDCCH corresponding to the CSI is greater than or equal to a fifth threshold; or the second uplink control information and/or the third uplink control information include/includes CSI scheduled by a PDCCH, and a distance between an earliest symbol on the second uplink channel and the third uplink channel and an ending symbol of a downlink reference signal corresponding to the CSI is greater than or equal to a sixth threshold.

Optionally, in an embodiment, when the third uplink control information includes the acknowledgment ACK/ negative acknowledgment NACK, a modulation and coding scheme table MCS table of the physical downlink shared channel PDSCH corresponding to the ACK/NACK is a first MCS table included in an MCS table set, where the MCS table set includes a plurality of MCS tables, and a spectrum efficiency corresponding to the first MCS table is less than a spectrum efficiency corresponding to another MCS table included in the MCS table set; or when the third uplink control information includes the acknowledgment ACK/negative acknowledgment NACK, a downlink control information DCI format corresponding to the ACK/NACK is a first DCI format included in a DCI format set, where the DCI format set includes a plurality of DCI formats, and a payload size corresponding to the first DCI format is less than a payload size corresponding to another DCI format included in the DCI format set; or when the third uplink control information includes the channel state information CSI, the CSI is aperiodic channel state information A-CSI that is triggered by the physical downlink control channel PDCCH and that is transmitted on a short-format physical uplink control channel PUCCH; or when the third uplink control information includes the channel state information CSI, a channel quality indicator table CQI table corresponding to the CSI is a first CQI table included in a CQI table set, where the CQI table set includes a plurality of CQI tables, and a spectrum efficiency corresponding to the first CQI table is less than a spectrum efficiency corresponding to another CQI table included in the CQI table set; or when the third uplink control information includes a first scheduling request SR, a period of the first SR is less than or equal to a seventh threshold; or when the third uplink control information includes a second scheduling request SR, a priority of a logical channel corresponding to the second SR is greater than or equal to an eighth threshold.

Optionally, in an embodiment, a third service corresponding to the third uplink control information is an ultra-reliable and low-latency communications URLLC service, and a second service corresponding to the second uplink control information is an enhanced mobile broadband eMBB service; and/or a latency requirement of a third service corresponding to the third uplink control information is higher than a latency requirement of a second service corresponding to the second uplink control information; and/or reliability of a third service corresponding to the third uplink control information is higher than reliability of a second service corresponding to the second uplink control information.

Optionally, in an embodiment, a value of the first threshold is any one of 0, two symbols, seven symbols, a half of a time domain length of the third uplink channel, or a time domain length of the third uplink channel.

Optionally, in an embodiment, a value of the second threshold is any one of 0, two symbols, seven symbols, or a period of the third uplink channel.

Optionally, in an embodiment, a value of the third threshold is 0 or 0.1.

It should be specially noted that in the foregoing apparatus embodiment, an entity device corresponding to the processing module is a processor, and an entity device corresponding to the sending module is a transmitter.

It should be understood that, for a specific process in which the foregoing corresponding steps are performed by the units in the apparatus 300, refer to the foregoing descriptions of the method embodiments with reference to FIG. 1 to FIG. 5. For brevity, details are not described herein again.

FIG. 7 is a schematic block diagram of an information transmission apparatus 400 according to an embodiment of this application. The apparatus 400 may correspond to the network device described in the foregoing method 200, or may be a chip or a component used in a network device, and each module or unit in the apparatus 400 is configured to perform each action or processing process performed by the network device in the foregoing method 200. As shown in FIG. 7, the communications apparatus 400 may include a processing module 410 and a receiving module 420.

The processing module 410 is configured to determine a first uplink channel, where the first uplink channel is used to carry joint information of second uplink control information carried on a second channel and third uplink control information carried on a third uplink channel; and the receiving module 420 is configured to: when the third uplink channel and the first uplink channel determined by the processing module 410 meet a first condition, receive the joint information on the first uplink channel; or when the third uplink channel and the first uplink channel do not meet a first condition, receive the third uplink control information on the third uplink channel, where the first condition includes at least one of the following conditions:

a distance between an ending symbol on the first uplink channel and an ending symbol on the third uplink channel is less than or equal to a first threshold; or a distance between a starting symbol on the first uplink channel and a starting symbol on the third uplink channel is less than or equal to a second threshold; or a difference between a coding rate of the first uplink channel and a coding rate of the third uplink channel is less than or equal to a third threshold.

According to the information transmission apparatus provided in this application, a latency requirement, a reliability requirement, and the like during transmission of the third uplink control information with a relatively high priority can be ensured. This ensures data transmission reliability of a high-priority service and improves communication efficiency, thereby improving user experience.

Optionally, in an embodiment, the second channel and the third channel meet a second condition, where the second condition includes any one of the following conditions:

the second uplink control information and/or the third uplink control information include/includes an acknowledgment ACK/a negative acknowledgment NACK, and a distance between an earliest symbol on the second uplink channel and the third uplink channel and an ending symbol on a physical downlink shared channel PDSCH corresponding to the ACK/NACK is greater than or equal to a fourth threshold; or the second uplink control information and/or the third uplink control information include/includes channel state information CSI scheduled by a physical downlink control channel PDCCH, and a distance between an earliest symbol on the second uplink channel and the third uplink channel and an ending symbol on the PDCCH corresponding to the CSI is greater than or equal to a fifth threshold; or the second uplink control information and/or the third uplink control information include/includes CSI scheduled by a PDCCH, and a distance between an earliest symbol on the second uplink channel and the third uplink channel and an ending symbol of a downlink reference signal corresponding to the CSI is greater than or equal to a sixth threshold.

Optionally, in an embodiment, when the third uplink control information includes the acknowledgment ACK/negative acknowledgment NACK, a modulation and coding scheme table MCS table of the physical downlink shared channel PDSCH corresponding to the ACK/NACK is a first MCS table included in an MCS table set, where the MCS table set includes a plurality of MCS tables, and a spectrum efficiency corresponding to the first MCS table is less than a spectrum efficiency corresponding to another MCS table included in the MCS table set; or when the third uplink control information includes the acknowledgment ACK/negative acknowledgment NACK, a downlink control information DCI format corresponding to the ACK/NACK is a first DCI format included in a DCI format set, where the DCI format set includes a plurality of DCI formats, and a payload size corresponding to the first DCI format is less than a payload size corresponding to another DCI format included in the DCI format set; or when the third uplink control information includes the channel state information CSI, the CSI is aperiodic channel state information A-CSI that is triggered by the physical downlink control channel PDCCH and that is transmitted on a short-format physical uplink control channel PUCCH; or when the third uplink control information includes the channel state information CSI, a channel quality indicator table CQI table corresponding to the CSI is a first CQI table included in a CQI table set, where the CQI table set includes a plurality of CQI tables, and a spectrum efficiency corresponding to the first CQI table is less than a spectrum efficiency corresponding to another CQI table included in the CQI table set; or when the third uplink control information includes a first scheduling request SR, a period of the first SR is less than or equal to a seventh threshold; or when the third uplink control information includes a second scheduling request SR, a priority of a logical channel corresponding to the second SR is greater than or equal to an eighth threshold.

Optionally, in an embodiment, a third service corresponding to the third uplink control information is an ultra-reliable and low-latency communications URLLC service, and a second service corresponding to the second uplink control information is an enhanced mobile broadband eMBB service; and/or a latency requirement of a third service corresponding to the third uplink control information is higher than a latency requirement of a second service corresponding to the second uplink control information; and/or reliability of a third service corresponding to the third uplink control information is higher than reliability of a second service corresponding to the second uplink control information.

Optionally, in an embodiment, a value of the first threshold is any one of 0, two symbols, seven symbols, a half of a time domain length of the third uplink channel, or a time domain length of the third uplink channel.

Optionally, in an embodiment, a value of the second threshold is any one of 0, two symbols, seven symbols, or a period of the third uplink channel.

Optionally, in an embodiment, a value of the third threshold is 0 or 0.1.

It should be understood that, for a specific process in which the foregoing corresponding steps are performed by the units in the apparatus 400, refer to the foregoing description of the embodiment of the method 200 shown in FIG. 2. For brevity, details are not described herein again.

It should be specially noted that in the foregoing apparatus embodiment, an entity device corresponding to the processing module is a processor, and an entity device corresponding to the receiving module is a receiver.

It should be further understood that division into the units in the apparatuses is merely logical function division. In an actual implementation, all or some of the units may be integrated into one physical entity, or may be physically separated. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. The processing element herein may also be referred to as a processor, and may be an integrated circuit having a signal processing capability. In an implementation process, the steps of the foregoing methods or the foregoing units may be implemented by using a hardware integrated logic circuit of the processor element, or may be implemented in a form of software invoked by the processing element.

In an example, a unit in any one of the foregoing apparatuses may be one or more integrated circuits configured to implement the foregoing methods, for example, one or more application-specific integrated circuits (application specific integrated circuit, ASIC), one or more digital signal processors (digital signal processor, DSP), one or more field programmable gate arrays (field programmable gate array, FPGA), or a combination of at least two of the integrated circuits. For another example, when the unit in the apparatus is implemented by scheduling a program by a processing element, the processing element may be a general purpose processor, for example, a central processing unit (central processing unit, CPU) or another processor that can invoke the program. For still another example, the units may be integrated and implemented in a form of a system-on-a-chip (system-on-a-chip, SOC).

The solutions provided in the embodiments of this application are described above mainly from perspectives of network elements. It can be understood that, to implement the foregoing functions, the network elements, for example, the terminal device and the network device entity, include corresponding hardware structures and/or software modules for performing the functions. A person skilled in the art should be easily aware that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 8:
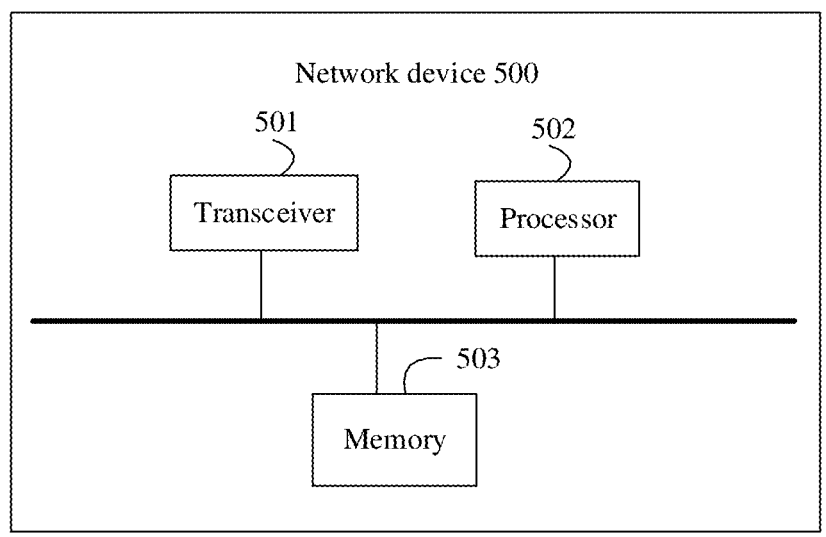
FIG. 8 is a possible schematic structural diagram of a network device according to an embodiment of this application.

FIG. 8 is a possible schematic structural diagram of the network device in the foregoing embodiment.

As shown in FIG. 8, the network device includes a transceiver 501, a processor 502, and a memory 503. The transceiver 501 is configured to: support the network device in transmitting information to and receiving information from the terminal device in the foregoing embodiment, and support radio communication between the terminal device and another terminal device. The processor 502 performs various functions used for communication with the terminal device. On an uplink, an uplink signal from the terminal device is received via an antenna, demodulated by the transceiver 501, and further processed by the processor 502, to restore service data and/or signaling information sent by the terminal device. On a downlink, service data and a signaling message are processed by the processor 502 and demodulated by the transceiver 501 to generate a downlink signal, and the downlink signal is transmitted to the terminal device via an antenna. The processor 502 also performs the processing process shown in FIG. 2 and/or another process used for the technology described in this application. The memory 503 is configured to store program code and data of a base station.

Figure 9:
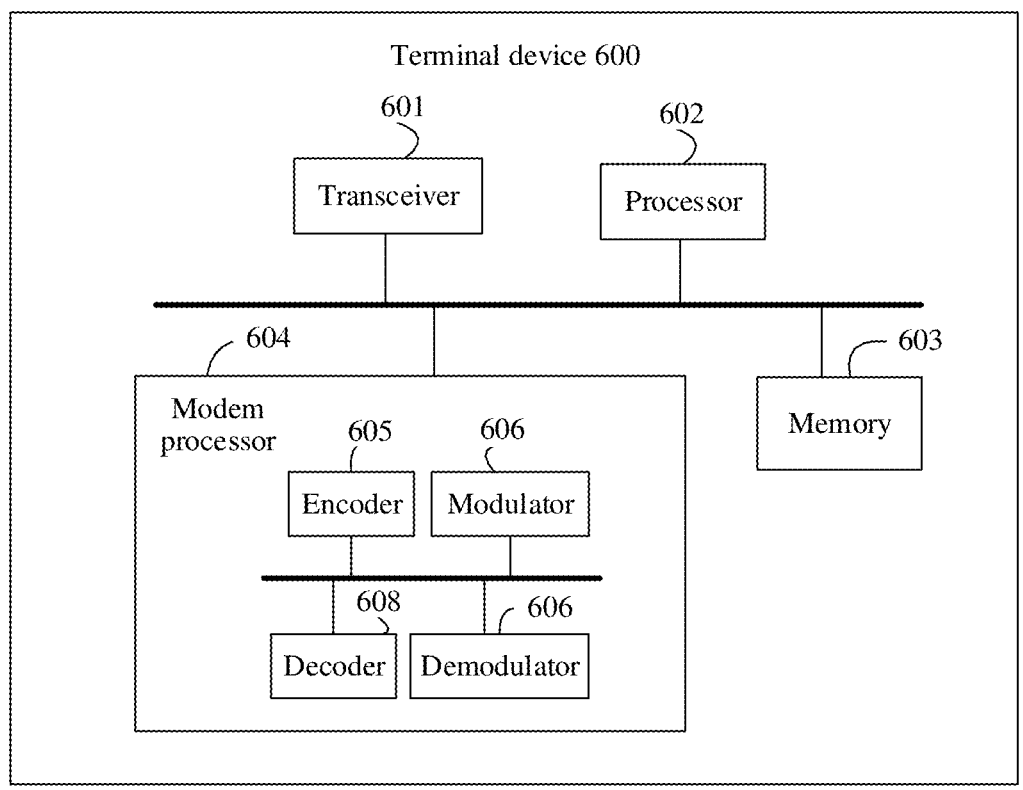
FIG. 9 is a possible schematic structural diagram of a terminal device according to an embodiment of this application.

FIG. 9 is a simplified schematic diagram of a possible design structure of the terminal device in the foregoing embodiment. The terminal device 600 includes a transceiver 601, a processor 602, a memory 603, and a modem processor 604.

The transceiver 601 adjusts (for example, performs analog conversion, filtering, amplification, and up-conversion on) an output sample and generates an uplink signal, where the uplink signal is transmitted to the network device in the foregoing embodiment via an antenna. On a downlink, an antenna receives a downlink signal transmitted by the network device in the foregoing embodiment. The transceiver 601 adjusts (for example, performs filtering, amplification, down-conversion, and digitization on) the signal received from the antenna and provides an input sample. In the modem processor 604, an encoder 605 receives service data and a signaling message that are to be sent on an uplink, and processes (for example, formats, encodes, and interleaves) the service data and the signaling message. A modulator 606 further processes (for example, performs symbol mapping and modulation on) encoded service data and an encoded signaling message, and provides an output sample. A demodulator 606 processes (for example, demodulates) the input sample and provides symbol estimation. A decoder 608 processes (for example, de-interleaves and decodes) the symbol estimation and provides decoded data and a decoded signaling message that are to be sent to the terminal device. The encoder 606, the modulator 606, the demodulator 606, and the decoder 608 may be implemented by the combined modem processor 605. These units perform processing based on a radio access technology (for example, an access technology in LTE and another evolved system) used in a radio access network.

The processor 602 controls and manages an action of the terminal device, to perform processing performed by the terminal device in the foregoing embodiment. For example, the processor 602 is configured to control the terminal device to obtain the first uplink channel, and control the terminal device to determine a technique process such as determining whether the first uplink channel and the third uplink channel meet the first condition, and whether the second uplink channel and the third uplink channel meet the second condition. The memory 603 is configured to store program code and data of the terminal device.

An embodiment of this application further provides a communications system. The communications system includes the foregoing terminal device and the foregoing network device.

It should be noted that the foregoing method embodiments in the embodiments of this application may be used for a processor, or implemented by a processor. The processor may be an integrated circuit chip and has a signal processing capability. In an implementation process, the steps in the foregoing method embodiments may be performed by using a hardware integrated logical circuit in the processor, or by using an instruction in a form of software. The foregoing processor may be a general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that the memory in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example descriptions rather than limitative descriptions, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that the memories in the systems and methods described in this specification include but are not limited to these memories and any memory of another proper type.

It should be understood that "one embodiment" or "an embodiment" mentioned in the entire specification means that particular features, structures, or characteristics related to the embodiment are included in one or more embodiments of this application. Therefore, "in one embodiment" or "in an embodiment" appearing throughout the entire specification does not necessarily refer to a same embodiment. In addition, the particular features, structures, or characteristics may be combined in one or more embodiments in any appropriate manner.

An embodiment of this application further provides a computer-readable medium, configured to store computer program code. The computer program includes an instruction used to perform the information transmission method in the embodiments of this application in the method 200. The readable medium may be a ROM or a RAM, and this is not limited in this embodiment of this application.

This application further provides a computer program product. The computer program product includes an instruction, and when the instruction is executed, the terminal device and the network device are enabled to perform operations corresponding to the terminal device and the network device in the foregoing method.

An embodiment of this application further provides a system chip. The system chip includes a processing unit and a communications unit. The processing unit may be, for example, a processor, and the communications unit may be, for example, an input/output interface, a pin, or a circuit. The processing unit may execute a computer instruction, so that a chip in the communications apparatus performs any information transmission method provided in the foregoing embodiments of this application.

Optionally, the computer instruction is stored in a storage unit.

Optionally, the storage unit is a storage unit inside the chip, such as a register or a cache. Alternatively, the storage unit may be a storage unit that is inside the terminal and that is located outside the chip, such as a ROM, another type of static storage device that can store static information and an instruction, or a RAM. The processor mentioned in any of the foregoing descriptions may be a CPU, a microprocessor, an ASIC, or one or more integrated circuits for controlling program execution of the foregoing feedback information transmission method. The processing unit and the storage unit may be decoupled, are separately disposed on different physical devices, and are connected in a wired or wireless manner to implement functions of the processing unit and the storage unit, to support the system chip in implementing various functions in the foregoing embodiments. Alternatively, the processing unit and the memory may be coupled to a same device.

Terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and that B may be determined based on A. However, it should be further understood that determining B based on A does not mean that B is determined based on only A. B may alternatively be determined based on A and/or other information.

All or some of the foregoing embodiments may be implemented by using software, hardware, firmware, or any combination thereof. When software is used to implement the embodiments, all or some of the embodiments may be implemented in a form of a computer program product. The computer program product may include one or more computer instructions. When the computer program instructions are loaded and executed on a computer, all or some of the procedures or the functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (solid state disk, SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, comprising:
   obtaining a first uplink channel to carry joint information of second uplink control information carried on a second uplink channel and third uplink control information carried on a third uplink channel;
   in response to the third uplink channel and the first uplink channel meeting a first condition, sending the joint information on the first uplink channel; and
   in response to the third uplink channel and the first uplink channel not meeting the first condition, sending the third uplink control information on the third uplink channel,
   wherein the first condition comprises:
      a difference between a coding rate of the first uplink channel and a coding rate of the third uplink channel is less than or equal to a third threshold, and
   wherein the first uplink channel is a physical uplink control channel (PUCCH).

2. The method according to claim 1, wherein
   the second uplink channel and the third uplink channel meet a second condition, and
   the second condition comprises any one of:
      at least one of the second uplink control information or the third uplink control information comprises an acknowledgment (ACK)/a negative acknowledgment (NACK), and a distance between an earliest symbol on the second uplink channel and the third uplink channel and an ending symbol on a physical downlink shared channel (PDSCH) corresponding to the ACK/NACK is greater than or equal to a fourth threshold,
      at least one of the second uplink control information or the third uplink control information comprises channel state information (CSI) scheduled by a physical downlink control channel (PDCCH), and a distance between the earliest symbol on the second uplink channel and the third uplink channel and an ending symbol on the PDCCH corresponding to the CSI is greater than or equal to a fifth threshold, or
      at least one of the second uplink control information or the third uplink control information comprises CSI scheduled by a PDCCH, and a distance between the earliest symbol on the second uplink channel and the third uplink channel and an ending symbol of a downlink reference signal corresponding to the CSI is greater than or equal to a sixth threshold.

3. The method according to claim 1, wherein
   priority of the third uplink control information is higher than priority of the second uplink control information.

4. The method according to claim 1, wherein at least one of:
   a third service corresponding to the third uplink control information is an ultra-reliable and low-latency communications (URLLC) service, and a second service corresponding to the second uplink control information is an enhanced mobile broadband (eMBB) service, a latency requirement of the third service corresponding to the third uplink control information is higher than a latency requirement of the second service corresponding to the second uplink control information, or reliability of the third service corresponding to the third uplink control information is higher than reliability of the second service corresponding to the second uplink control information.

5. The method according to claim 1, wherein the first condition further comprises at least one of:
- a distance between an ending symbol on the first uplink channel and an ending symbol on the third uplink channel is less than or equal to a first threshold, or
- a distance between a starting symbol on the first uplink channel and a starting symbol on the third uplink channel is less than or equal to a second threshold, and at least one of:
- a value of the first threshold is any one of 0 symbols, two symbols, seven symbols, a half of a time domain length of the third uplink channel, or the time domain length of the third uplink channel,
- a value of the second threshold is any one of 0 symbols, two symbols, seven symbols, or a period of the third uplink channel, or
- a value of the third threshold is 0 or 0.1.

6. An information transmission method, comprising:
determining a first uplink channel to carry joint information of second uplink control information carried on a second uplink channel and third uplink control information carried on a third uplink channel;
in response to the third uplink channel and the first uplink channel meeting a first condition, receiving the joint information on the first uplink channel; and
in response to the third uplink channel and the first uplink channel not meeting the first condition, receiving the third uplink control information on the third uplink channel,
wherein the first condition comprises:
a difference between a coding rate of the first uplink channel and a coding rate of the third uplink channel is less than or equal to a third threshold, and
wherein the first uplink channel is a physical uplink control channel (PUCCH).

7. The method according to claim 6, wherein the second uplink channel and the third uplink channel meet a second condition, and
the second condition comprises any one of:
- at least one of the second uplink control information or the third uplink control information comprises an acknowledgment (ACK)/a negative acknowledgment (NACK), and a distance between an earliest symbol on the second uplink channel and the third uplink channel and an ending symbol on a physical downlink shared channel (PDSCH) corresponding to the ACK/NACK is greater than or equal to a fourth threshold,
- at least one of the second uplink control information or the third uplink control information comprises channel state information (CSI) scheduled by a physical downlink control channel (PDCCH), and a distance between the earliest symbol on the second uplink channel and the third uplink channel and an ending symbol on the PDCCH corresponding to the CSI is greater than or equal to a fifth threshold, or
- at least one of the second uplink control information or the third uplink control information comprises CSI scheduled by a PDCCH, and a distance between the earliest symbol on the second uplink channel and the third uplink channel and an ending symbol of a downlink reference signal corresponding to the CSI is greater than or equal to a sixth threshold.

8. The method according to claim 6, wherein priority of the third uplink control information is higher than priority of the second uplink control information.

9. The method according to claim 6, wherein at least one of:
- a third service corresponding to the third uplink control information is an ultra-reliable and low-latency communications (URLLC) service, and a second service corresponding to the second uplink control information is an enhanced mobile broadband (eMBB) service,
- a latency requirement of the third service corresponding to the third uplink control information is higher than a latency requirement of the second service corresponding to the second uplink control information, or
- reliability of the third service corresponding to the third uplink control information is higher than reliability of the second service corresponding to the second uplink control information.

10. The method according to claim 6, wherein the first condition further comprises at least one of:
- a distance between an ending symbol on the first uplink channel and an ending symbol on the third uplink channel is less than or equal to a first threshold, or
- a distance between a starting symbol on the first uplink channel and a starting symbol on the third uplink channel is less than or equal to a second threshold, and at least one of:
- a value of the first threshold is any one of 0 symbols, two symbols, seven symbols, a half of a time domain length of the third uplink channel, or the time domain length of the third uplink channel,
- a value of the second threshold is any one of 0 symbols, two symbols, seven symbols, or a period of the third uplink channel, or
- a value of the third threshold is 0 or 0.1.

11. An information transmission apparatus, comprising:
a processor, configured to obtain a first uplink channel to carry joint information of second uplink control information carried on a second uplink channel and third uplink control information carried on a third uplink channel; and
a transmitter, configured to:
in response to the third uplink channel and the first uplink channel obtained by the processor meeting a first condition, send the joint information on the first uplink channel, and
in response to the third uplink channel and the first uplink channel not meeting the first condition, send the third uplink control information on the third uplink channel,
wherein the first condition comprises:
a difference between a coding rate of the first uplink channel and a coding rate of the third uplink channel is less than or equal to a third threshold, and
wherein the first uplink channel is a physical uplink control channel (PUCCH).

12. The apparatus according to claim 11, wherein
the second uplink channel and the third uplink channel meet a second condition, and
the second condition comprises any one of:
- at least one of the second uplink control information or the third uplink control information comprises an acknowledgment (ACK)/a negative acknowledgment (NACK), and a distance between an earliest symbol on the second uplink channel and the third uplink channel and an ending symbol on a physical downlink shared channel (PDSCH) corresponding to the ACK/NACK is greater than or equal to a fourth threshold,
- at least one of the second uplink control information or the third uplink control information comprises channel state information (CSI) scheduled by a physical downlink control channel (PDCCH), and a distance between the earliest symbol on the second uplink channel and the third uplink channel and an ending symbol on the PDCCH corresponding to the CSI is greater than or equal to a fifth threshold, or
- at least one of the second uplink control information or the third uplink control information comprises CSI scheduled by a PDCCH, and a distance between the earliest symbol on the second uplink channel and the third uplink channel and an ending symbol of a downlink reference signal corresponding to the CSI is greater than or equal to a sixth threshold.

13. The apparatus according to claim 11, wherein priority of the third uplink control information is higher than priority of the second uplink control information.

14. The apparatus according to claim 11, wherein at least one of
- a third service corresponding to the third uplink control information is an ultra-reliable and low-latency communications (URLLC) service, and a second service corresponding to the second uplink control information is an enhanced mobile broadband (eMBB) service,
- a latency requirement of the third service corresponding to the third uplink control information is higher than a latency requirement of the second service corresponding to the second uplink control information, or
- reliability of the third service corresponding to the third uplink control information is higher than reliability of the second service corresponding to the second uplink control information.

15. The apparatus according to claim 11, wherein the first condition further comprises at least one of:
- a distance between an ending symbol on the first uplink channel and an ending symbol on the third uplink channel is less than or equal to a first threshold, or
- a distance between a starting symbol on the first uplink channel and a starting symbol on the third uplink channel is less than or equal to a second threshold, and
at least one of:
- a value of the first threshold is any one of 0 symbols, two symbols, seven symbols, a half of a time domain length of the third uplink channel, or the time domain length of the third uplink channel,
- a value of the second threshold is any one of 0 symbols, two symbols, seven symbols, or a period of the third uplink channel, or
- a value of the third threshold is 0.1.

16. An information transmission apparatus, comprising:
a processor, configured to determine a first uplink channel to carry joint information of second uplink control information carried on a second uplink channel and third uplink control information carried on a third uplink channel; and
a receiver, configured to:
- in response to the third uplink channel and the first uplink channel determined by the processor meeting a first condition, receive the joint information on the first uplink channel, and
- in response to the third uplink channel and the first uplink channel not meeting the first condition, receive the third uplink control information on the third uplink channel, wherein the first condition comprises:
a difference between a coding rate of the first uplink channel and a coding rate of the third uplink channel is less than or equal to a third threshold, and
wherein the first uplink channel is a physical uplink control channel (PUCCH).

17. The apparatus according to claim 16, wherein
the second uplink channel and the third uplink channel meet a second condition, and
the second condition comprises any one of:
- at least one of the second uplink control information or the third uplink control information comprises an acknowledgment (ACK)/a negative acknowledgment (NACK), and a distance between an earliest symbol on the second uplink channel and the third uplink channel and an ending symbol on a physical downlink shared channel (PDSCH) corresponding to the ACK/NACK is greater than or equal to a fourth threshold,
- at least one of the second uplink control information or the third uplink control information comprises channel state information (CSI) scheduled by a physical downlink control channel (PDCCH), and a distance between an earliest symbol on the second uplink channel and the third uplink channel and an ending symbol on the PDCCH corresponding to the CSI is greater than or equal to a fifth threshold, or
- at least one of the second uplink control information or the third uplink control information comprises CSI scheduled by a PDCCH, and a distance between the earliest symbol on the second uplink channel and the third uplink channel and an ending symbol of a downlink reference signal corresponding to the CSI is greater than or equal to a sixth threshold.

18. The apparatus according to claim 16, wherein priority of the third uplink control information is higher than priority of the second uplink control information.

19. The apparatus according to claim 16, wherein at least one of:
- a third service corresponding to the third uplink control information is an ultra-reliable and low-latency communications (URLLC) service, and a second service corresponding to the second uplink control information is an enhanced mobile broadband (eMBB) service,
- a latency requirement of the third service corresponding to the third uplink control information is higher than a latency requirement of the second service corresponding to the second uplink control information, or
- reliability of the third service corresponding to the third uplink control information is higher than reliability of the second service corresponding to the second uplink control information.

20. The apparatus according to claim 16, wherein the first condition further comprises at least one of:
- a distance between an ending symbol on the first uplink channel and an ending symbol on the third uplink channel is less than or equal to a first threshold, or
- a distance between a starting symbol on the first uplink channel and a starting symbol on the third uplink channel is less than or equal to a second threshold, and at least one of:
- a value of the first threshold is any one of 0 symbols, two symbols, seven symbols, a half of a time domain length of the third uplink channel, or the time domain length of the third uplink channel,
- a value of the second threshold is any one of 0 symbols, two symbols, seven symbols, or a period of the third uplink channel, or
- a value of the third threshold is 0 or 0.1.

* * * * *